(12) United States Patent
Shi et al.

(10) Patent No.: US 12,701,468 B2
(45) Date of Patent: Aug. 4, 2026

(54) DATA TRANSMISSION METHOD AND RELATED DEVICE

(71) Applicant: Huawei Technologies Co., Ltd., Shenzhen (CN)

(72) Inventors: Xiaoli Shi, Shanghai (CN); Wenjie Peng, Shanghai (CN); Mingzeng Dai, Shenzhen (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 970 days.

(21) Appl. No.: 17/651,091

(22) Filed: Feb. 15, 2022

(65) Prior Publication Data

US 2022/0174556 A1 Jun. 2, 2022

Related U.S. Application Data

(63) Continuation of application No. PCT/CN2020/108648, filed on Aug. 12, 2020.

(30) Foreign Application Priority Data

Aug. 16, 2019 (CN) .......................... 201910767626.8

(51) Int. Cl.
*H04W 36/00* (2009.01)
*H04W 36/08* (2009.01)

(52) U.S. Cl.
CPC . *H04W 36/0027* (2013.01); *H04W 36/00837* (2018.08); *H04W 36/08* (2013.01); *H04W 36/00698* (2023.05)

(58) Field of Classification Search
None
See application file for complete search history.

(56) References Cited

U.S. PATENT DOCUMENTS

| | | | |
|---|---|---|---|
| 9,357,464 B2* | 5/2016 | Olofsson | ....... H04W 36/008375 |
| 2008/0132239 A1* | 6/2008 | Khetawat | .......... H04W 36/0016 |
| | | | 455/438 |

(Continued)

FOREIGN PATENT DOCUMENTS

| | | |
|---|---|---|
| CN | 106063328 A | 10/2016 |
| CN | 107690163 A | 2/2018 |

(Continued)

OTHER PUBLICATIONS

"3rd Generation Partnership Project; Technical Specification Group Radio Access Network; Evolved Universal Terrestrial Radio Access (E-UTRA) and NR; Study on RAN-centric data collection and utilization for LTE and NR (Release 16)", 3GPP TR 37.816 V1.0.0, May 27, 2019 (Year: 2019).*

(Continued)

*Primary Examiner* — Mariela Vidal Carpio
(74) *Attorney, Agent, or Firm* — Slater Matsil, LLP

(57) ABSTRACT

Embodiments of this application disclose a data transmission method and a related device. The method includes: A first network device receives first indication information from a second network device, where the first indication information is used to indicate that a terminal device is successfully handed over from a third network device to the first network device or that the third network device has released a context of the terminal device; and the first network device detects a mobility problem based on the first indication information. According to the method provided in the embodiments of this application, a target SN may detect a mobility problem based on indication information sent by an MN.

19 Claims, 13 Drawing Sheets

(56) References Cited

U.S. PATENT DOCUMENTS

| | | | | |
|---|---|---|---|---|
| 2010/0173633 | A1* | 7/2010 | Catovic | H04W 36/0079 |
| | | | | 455/436 |
| 2011/0250925 | A1* | 10/2011 | Han | H04W 36/0079 |
| | | | | 455/524 |
| 2011/0263255 | A1* | 10/2011 | Alonso-Rubio | H04W 36/0088 |
| | | | | 455/436 |
| 2013/0017834 | A1* | 1/2013 | Han | H04W 36/0079 |
| | | | | 455/437 |
| 2013/0165108 | A1* | 6/2013 | Xu | H04W 24/00 |
| | | | | 455/423 |
| 2013/0178204 | A1* | 7/2013 | Zhang | H04W 24/02 |
| | | | | 455/423 |
| 2013/0183977 | A1* | 7/2013 | Han | H04W 36/0079 |
| | | | | 455/436 |
| 2013/0223408 | A1* | 8/2013 | Brandt | H04W 36/0064 |
| | | | | 370/331 |
| 2014/0200004 | A1* | 7/2014 | Wegmann | H04W 24/10 |
| | | | | 455/436 |
| 2014/0248882 | A1* | 9/2014 | Wang | H04W 36/00837 |
| | | | | 455/436 |
| 2015/0207672 | A1* | 7/2015 | Xu | H04W 36/0058 |
| | | | | 370/242 |
| 2015/0312813 | A1* | 10/2015 | Xu | H04W 36/0058 |
| | | | | 455/438 |
| 2016/0100341 | A1* | 4/2016 | Wu | H04W 36/00837 |
| | | | | 455/436 |
| 2016/0286442 | A1* | 9/2016 | Huang | H04W 36/00837 |
| 2017/0086109 | A1* | 3/2017 | da Silva | H04W 76/18 |
| 2017/0325132 | A1* | 11/2017 | Xu | H04W 36/0066 |
| 2017/0353896 | A1* | 12/2017 | Nath | H04W 36/385 |
| 2019/0090144 | A1 | 3/2019 | Wu | |
| 2020/0396658 | A1* | 12/2020 | Szilagyi | H04W 36/0083 |
| 2020/0396660 | A1* | 12/2020 | Wu | H04W 76/27 |
| 2021/0014750 | A1* | 1/2021 | Fang | H04W 76/15 |
| 2021/0195675 | A1* | 6/2021 | Park | H04W 88/14 |
| 2022/0124817 | A1* | 4/2022 | Byun | H04W 24/02 |
| 2022/0217594 | A1* | 7/2022 | Kim | H04W 36/0085 |
| 2022/0279391 | A1* | 9/2022 | Bae | H04W 36/0033 |
| 2022/0330126 | A1* | 10/2022 | Yan | H04W 24/04 |
| 2023/0134552 | A1* | 5/2023 | Kim | H04W 60/04 |
| | | | | 370/329 |

FOREIGN PATENT DOCUMENTS

| | | | |
|---|---|---|---|
| CN | 108990116 | A | 12/2018 |
| CN | 109246839 | A | 1/2019 |
| EP | 2983445 | A1 | 2/2016 |
| WO | 2016019541 | A1 | 2/2016 |

OTHER PUBLICATIONS

CATT, "Discussion on UE RLF report for MRO", 3GPP TSG-RAN WG3 #104, R3-192533, Reno, NV, US, May 13-47, 2019, 9 pages.

3GPP TS 37.340 V15.6.0 (Jun. 2019), 3rd Generation Partnership Project; Technical Specification Group Radio Access Network; Evolved Universal Terrestrial Radio Access (E-UTRA) and NR; Multi-connectivity; Stage 2 (Release 15), 69 pages.

3GPP TS 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15), 960 pages.

3GPP TR 37.816 V16.0.0 (Jul. 2019), 3rd Generation Partnership Project; Technical Specification Group Radio Access Network; Study on RAN-centric data collection and utilization for LTE and NR (Release 16), 35 pages.

3GPP TS 25.413 V15.0.0 (Jun. 2018), 3rd Generation Partnership Project; Technical Specification Group Radio Access Network; UTRAN Iu interface Radio Access Network Application Part (RANAP) signalling (Release 15), 455 pages.

Samsung, "Additional RLF information reporting for MRO" 3GPP TSG-RAN WG3 Meeting #66bis, R3-100323, Valencia, Spain, Jan. 17-22, 2010, 3 pages.

Fujitsu, "Timers in MRO failure detection", 3GPP TSG-RAN WG3 #76, R3-121302, Prague, Czech Republic, May 21-25, 2012, 5 pages.

Huawei, "Discussion of mobility optimization", 3GPP TSG-RAN3 Meeting #103, R3-190380, Athens, Greece, Feb. 25-Mar. 1, 2019, 3 pages.

Nokia et al., "SN change Failure" 3GPP TSG-RAN WG3 Meeting #104, R3-192765, Reno, NV, US, May 13-17, 2019, 2 pages.

Huawei, "SN change failure in case of MR-DC", 3GPP TSG-RAN3 Meeting #103bis, R3-192960, Reno, NV, US, May 13-17, 2019, 4 pages.

Huawei et al., "(TP for SON BL CR for TS 38.300): additional MRO features", 3GPP TSG-RAN3 Meeting #105bis, R3-195413, Chongqing, China, Oct. 14-18, 2019, 9 pages.

3rd Generation Partnership Project; Technical Specification Group Radio Access Network; Evolved Universal Terrestrial Radio Access (E-UTRA) and NR; Study on RAN-centric data collection and utilization for LTE and NR (Release 16), 3GPP TR 37.816 V1.0.0 (Jun. 2019) Technical Report, total 35 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.5.0 (Mar. 2013) Technical Specification, total 209 pages.

* cited by examiner

Wireless communication system 100

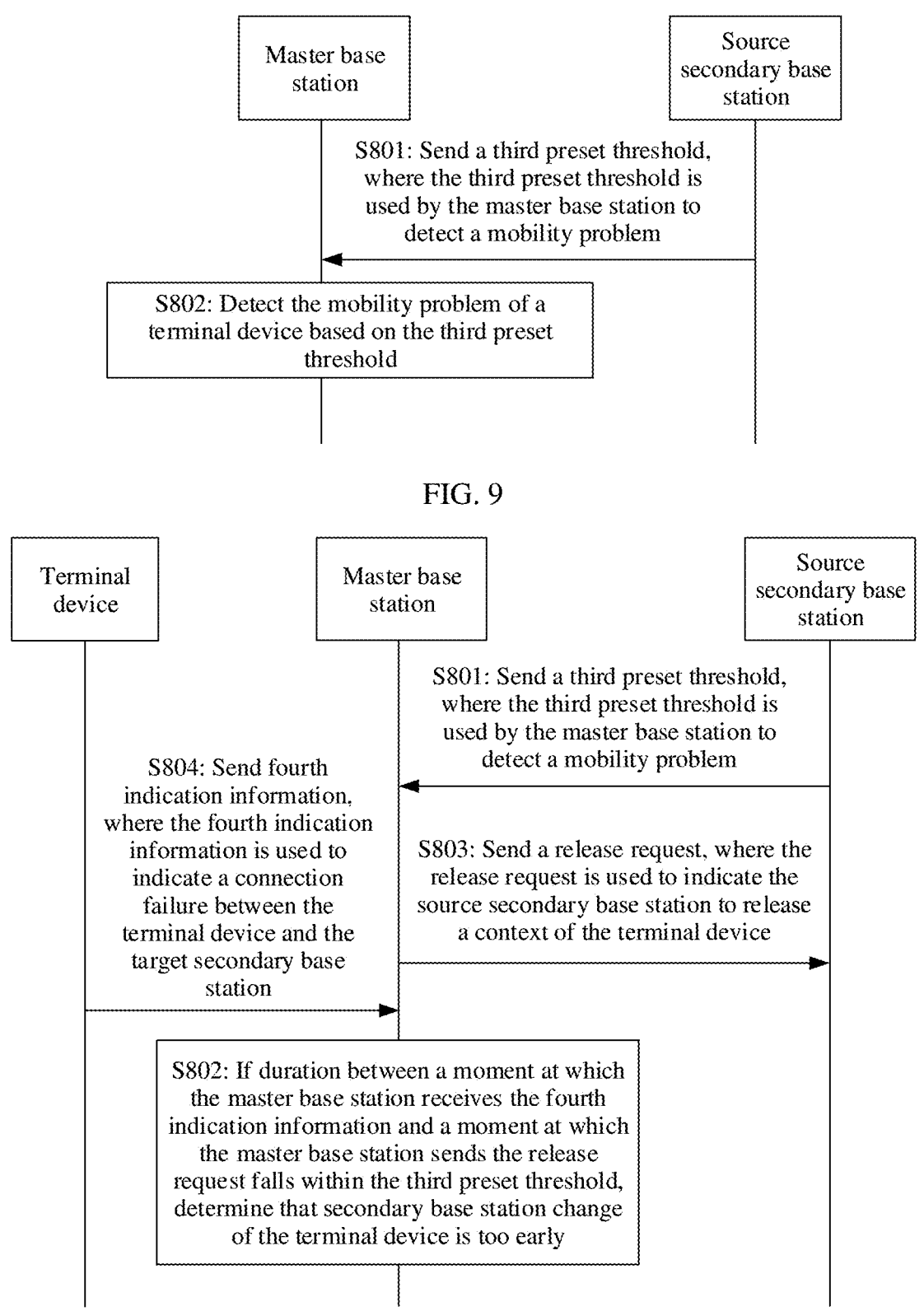

Master base station

Source secondary base station

S801: Send a third preset threshold, where the third preset threshold is used by the master base station to detect a mobility problem S802: Detect the mobility problem of a terminal device based on the third preset threshold

FIG. 9

Terminal device

Master base station

Source secondary base station

S801: Send a third preset threshold, where the third preset threshold is used by the master base station to detect a mobility problem S804: Send fourth indication information, where the fourth indication information is used to indicate a connection failure between the terminal device and the target secondary base station S803: Send a release request, where the release request is used to indicate the source secondary base station to release a context of the terminal device S802: If duration between a moment at which the master base station receives the fourth indication information and a moment at which the master base station sends the release request falls within the third preset threshold, determine that secondary base station change of the terminal device is too early

FIG. 10

Communication apparatus 1300

Communication apparatus 1600

DATA TRANSMISSION METHOD AND RELATED DEVICE

CROSS-REFERENCE TO RELATED APPLICATIONS

This application is a continuation of International Application No. PCT/CN2020/108648, filed on Aug. 12, 2020, which claims priority to Chinese Patent Application No. 201910767626.8, filed on Aug. 16, 2019. The disclosures of the aforementioned applications are hereby incorporated by reference in their entireties.

TECHNICAL FIELD

The present invention relates to the field of communication technologies, and in particular, to a data transmission method and a related device.

BACKGROUND

In a multi-radio dual connectivity (MR-DC) scenario, user equipment (UE) may be connected to at least two base stations: a master base station (MN) and a secondary base station (SN). In the MR-DC scenario, to support a secondary base station change scenario, the MN or a source SN connected to the UE may trigger the UE to be handed over from the source SN to a target SN. After the UE is handed over to the target SN, the MN sends a context release message of the UE to the source SN, and the source SN releases a context of the UE. In this process, the target SN cannot detect a mobility problem.

SUMMARY

Embodiments of this application provide a data transmission method and a related device. A target SN may detect a mobility problem based on indication information sent by an MN.

According to a first aspect, an embodiment of this application provides a data transmission method, applied to a first network device side. The method includes: A first network device receives first indication information from a second network device, where the first indication information is used to indicate that a terminal device is successfully handed over from a third network device to the first network device or that the third network device has released a context of the terminal device. The first network device detects a mobility problem based on the first indication information.

Optionally, the first network device may be a target secondary base station connected to the terminal device after secondary base station change is performed on the terminal device. The second network device may be a master base station connected to the terminal device. The third network device may be a source secondary base station connected to the terminal device before the secondary base station change is performed on the terminal device. In this embodiment of this application, the master base station may notify the target secondary base station of indication information indicating that the source secondary base station has released the context of the UE (or secondary base station change of the UE is completed), so that the target secondary base station can detect a mobility problem based on the indication information.

The mobility problem may also be referred to as a change failure event, a radio link failure event, a radio connection failure event, or the like. For example, the mobility problem may be too early secondary base station change, too late secondary base station change, or change to wrong cell.

In a possible design, the method further includes: The first network device receives second indication information from the second network device, where the second indication information is used to indicate a radio link failure between the terminal device and the first network device. That the first network device detects a mobility problem based on the first indication information is specifically: The first network device determines, based on an interval between a receiving moment of the first indication information and a receiving moment of the second indication information, whether secondary base station change of the terminal device is too early. For example, if duration between a moment at which the first network device receives the second indication information and a moment at which the first network device receives the first indication information falls within a first preset threshold, the first network device determines that the secondary base station change of the terminal device is too early.

If the duration between the moment at which the first network device receives the second indication information and the moment at which the first network device receives the first indication information falls within the first preset threshold, the first network device may further send third indication information to the second network device, where the third indication information is used to indicate that the mobility problem is that secondary network device change of the terminal device is too early.

In this embodiment of this application, the first network device may receive the first indication information from the second network device, where the first indication information indicates the secondary base station of the terminal device to change from the source secondary base station to the target secondary base station (or indicates that the source secondary base station releases the context of the terminal device). The first network device may further receive the second indication information from the second network device, where the second indication information indicates the radio link failure between the terminal device and the target secondary base station. The first network device determines, based on an interval between a receiving moment of the first indication information and a receiving moment of the second indication information, whether a radio link failure cause is that secondary base station change is too early, so that the second network device or the third network device may optimize a mobility parameter of the secondary base station based on the radio link failure cause. This avoids a mobility failure caused by too early secondary base station change.

In a possible design, the first preset threshold is configured by the first network device or an operation administration and maintenance (OAM) device of the first network device.

In a possible design, after the first network device receives the first indication information from the second network device, the method further includes: The first network device starts a timer, where timing duration of the timer is the first preset threshold. That if the duration between the moment at which the first network device receives the second indication information and the moment at which the first network device receives the first indication information falls within the first preset threshold, the first network device sends third indication information to the second network device includes: If the timer does not stop running when the first network device receives the second indication information, the first network device sends the third indication information to the second network device.

In a possible design, before the first network device receives the first indication information from the second network device, the method further includes: The first network device determines that the terminal device is synchronized to the first network device. This case is applicable to an SN change scenario triggered by the secondary base station.

Optionally, that the first network device determines that the terminal device is synchronized to the first network device may be understood as that the first network device completes a random access process with the terminal device. That the first network device completes a random access process with the terminal device may be, for example, that the first network device receives an RRC connection setup complete message sent by the terminal device.

In a possible design, before the first network device receives the first indication information from the second network device, the method further includes: The first network device determines that secondary base station reconfiguration of the terminal device is completed. This case is applicable to an MN change scenario triggered by the secondary base station. Optionally, that the first network device determines that secondary base station reconfiguration of the terminal device is completed may be, for example, that the first network device receives a secondary base station reconfiguration complete message sent by the second network device.

In a possible design, before the first network device receives the first indication information from the second network device, the method further includes: The first network device receives a resource allocation request message from the second network device, where the resource allocation request message is used to request the first network device to allocate a resource to the terminal device. The first network device allocates the resource to the terminal device based on the resource allocation request message, and sends a resource allocation response message to the second network device.

According to a second aspect, an embodiment of this application provides another data transmission method, applied to a second network device side. The method includes: A second network device generates first indication information, where the first indication information is used to indicate that a terminal device is successfully handed over from a third network device to a first network device or that the third network device has released a context of the terminal device. The second network device sends the first indication information to the first network device, where the first indication information is used by the first network device to detect a mobility problem.

Optionally, the first network device may be a target secondary base station connected to the terminal device after secondary base station change is performed on the terminal device. The second network device may be a master base station connected to the terminal device. The third network device may be a source secondary base station connected to the terminal device before the secondary base station change is performed on the terminal device. In this embodiment of this application, the master base station may notify the target secondary base station of indication information indicating that the source secondary base station has released a context of the UE (or secondary base station change of the UE is completed), so that the target secondary base station can detect a mobility problem based on the indication information. The mobility problem may also be referred to as a change failure event, a radio link failure event, a radio connection failure event, or the like. For example, the mobility problem may be too early secondary base station change, too late secondary base station change, or change to wrong cell.

In a possible design, the method further includes: The second network device receives fourth indication information from the terminal device, where the fourth indication information is used to indicate a radio link failure between the terminal device and the first network device. The second network device sends second indication information to the first network device, where the second indication information is used to indicate the radio link failure between the terminal device and the first network device. The second network device receives third indication information from the first network device, where the third indication information is used to indicate that secondary network device change of the terminal device is too early.

In this embodiment of this application, the second network device may send the first indication information to the first network device, where the first indication information indicates the secondary base station of the terminal device to change from the source secondary base station to the target secondary base station (or indicates that the source secondary base station releases the context of the terminal device). The second network device may further send the second indication information to the first network device, where the second indication information indicates the radio link failure between the terminal device and the target secondary base station. The first network device is enabled to determine based on an interval between a receiving moment of the first indication information and a receiving moment of the second indication information, whether a radio link failure cause is that secondary base station change is too early, so that the second network device or the third network device may optimize a mobility parameter of the secondary base station based on the radio link failure cause. This avoids a mobility failure caused by too early secondary base station change.

In a possible design, before the second network device sends the first indication information to the first network device, the method further includes: The second network device sends a resource allocation request message to the first network device, where the resource allocation request message is used to request the first network device to allocate a resource to the terminal device. The second network device receives a resource allocation response message from the first network device.

In a possible design, before the second network device sends the first indication information to the first network device, the method further includes: The second network device sends a release request to a third network device, where the release request is used to request the third network device to release a context of the terminal device.

According to a third aspect, an embodiment of this application provides another data transmission method, applied to a first network device side. The method includes: A first network device determines that a terminal device is synchronized to the first network device. The first network device receives second indication information from a second network device, where the second indication information is used to indicate a radio link failure between the terminal device and the first network device. If duration between a moment at which the first network device receives the second indication information and a moment at which the terminal device is synchronized to the first network device falls within a second preset threshold, the first network device sends third indication information to the second network device, where the third indication information is used to indicate that secondary network device change of the terminal device is too early. In this embodiment of this application, if the first network device receives, within the second preset threshold after determining that the terminal device is synchronized to the first network device, the second indication information sent by the second network device, the first network device determines that a radio link failure cause is that secondary base station change is too early. This helps a source secondary base station optimize a mobility parameter of the secondary base station based on the radio link failure cause, to avoid a mobility failure caused by too early secondary base station change.

In a possible design, timing duration of a timer is configured by the first network device or an operation administration and maintenance OAM device of the first network device.

In a possible design, after the first network device determines that the terminal device is synchronized to the first network device, the method further includes: The first network device starts the timer, where the timing duration of the timer is the second preset threshold. That if duration between a moment at which the first network device receives the second indication information and a moment at which the terminal device is synchronized to the first network device falls within a second preset threshold, the first network device sends third indication information to the second network device includes: If the timer does not stop running when the first network device receives the second indication information, the first network device sends the third indication information to the second network device.

In a possible design, before the first network device determines that secondary base station reconfiguration of the terminal device is completed, the method further includes: The first network device receives a resource allocation request message from the second network device, where the resource allocation request message is used to request the first network device to allocate a resource to the terminal device. The first network device allocates the resource to the terminal device based on the resource allocation request message, and sends a resource allocation response message to the second network device.

According to a fourth aspect, an embodiment of this application provides another data transmission method, applied to a first network device side. The method includes: A first network device determines that secondary base station reconfiguration of a terminal device is completed. The first network device receives second indication information from a second network device, where the second indication information is used to indicate a radio link failure between the terminal device and the first network device. If duration between a moment at which the first network device receives the second indication information and a moment at which the secondary base station reconfiguration of the terminal device is completed falls within a second preset threshold, the first network device sends third indication information to the second network device, where the third indication information is used to indicate that secondary network device change of the terminal device is too early. In this embodiment of this application, if the first network device receives, within the second preset threshold after determining that the secondary base station reconfiguration of the terminal device is completed, the second indication information sent by the second network device, the first network device determines that a radio link failure cause is that secondary base station change is too early. This helps a source secondary base station optimize a mobility parameter of the secondary base station based on the radio link failure cause, to avoid a mobility failure caused by too early secondary base station change.

In a possible design, timing duration of a timer is configured by the first network device or an operation administration and maintenance OAM device of the first network device.

In a possible design, after the first network device determines that secondary base station reconfiguration of the terminal device is completed, the method further includes: The first network device starts the timer, where the timing duration of the timer is the second preset threshold. That if duration between a moment at which the first network device receives the second indication information and a moment at which the terminal device is synchronized to the first network device falls within a second preset threshold, the first network device sends third indication information to the second network device includes: If the timer does not stop running when the first network device receives the second indication information, the first network device sends the third indication information to the second network device.

In a possible design, before the first network device determines that secondary base station reconfiguration of the terminal device is completed, the method further includes: The first network device receives a resource allocation request message from the second network device, where the resource allocation request message is used to request the first network device to allocate a resource to the terminal device. The first network device allocates the resource to the terminal device based on the resource allocation request message, and sends a resource allocation response message to the second network device.

According to a fifth aspect, an embodiment of this application provides another data transmission method, applied to a second network device side. The method includes: A second network device receives a third preset threshold from a first network device. The second network device detects a mobility problem of a terminal device based on the third preset threshold. Optionally, the first network device may be a target secondary base station connected to the terminal device after secondary base station change is performed on the terminal device. The second network device may be a master base station connected to the terminal device. In this embodiment of this application, the second network device may obtain the third preset threshold from the first network device, and then detect the mobility problem of the terminal device based on the third preset threshold.

In a possible design, the method further includes: The second network device sends a release request to the third network device, where the release request is used to request the third network device to release a context of the terminal device. The second network device receives fourth indication information from the terminal device, where the fourth indication information is used to indicate a radio link failure between the terminal device and the first network device. The first network device is a target secondary network device to which the terminal device is handed over from the third network device. That the second network device detects a mobility problem of a terminal device based on the third preset threshold includes: If duration between a moment at which the second network device receives the fourth indication information and a moment at which the second network device sends the release request falls within the third preset threshold, the second network device determines that secondary network device change of the terminal device is too early.

In this embodiment of this application, the second network device determines, based on an interval between a receiving moment of the fourth indication information and a sending moment of a UE context release message to the third network device, whether a radio link failure cause is that secondary base station change is too early, so that the master base station or a source secondary base station optimizes a mobility parameter of the secondary base station based on the radio link failure cause. This avoids a mobility failure caused by too early secondary base station change.

In a possible design, the method further includes: The second network device receives from the first network device, one or more of an identifier of the first network device corresponding to the third preset threshold and an identifier of a cell corresponding to the third preset threshold.

In a possible design, after the second network device sends the release request to the third network device, the method further includes: The second network device starts a timer, where timing duration of the timer is the third preset threshold. That if duration between a moment at which the second network device receives the fourth indication information and a moment at which the second network device sends the release request falls within the third preset threshold, the second network device determines that secondary network device change of the terminal device is too early includes: If the timer does not stop running when the second network device receives the fourth indication information, the second network device determines that the secondary network device change of the terminal device is too early.

In a possible design, after determining that the secondary base station change of the terminal device is too early, the second network device may further send fifth indication information to the third network device, where the fifth indication information is used to indicate that the secondary base station change of the terminal device is too early. This case is applicable to a secondary base station change scenario triggered by an SN.

According to a sixth aspect, an embodiment of this application provides another data transmission method, applied to a first network device side. The method includes: A first network device generates a third preset threshold. The first network device sends the third preset threshold to a second network device. The third preset threshold is used by the second network device to detect a mobility problem of a terminal device. Optionally, the first network device may be a target secondary base station connected to the terminal device after secondary base station change is performed on the terminal device. The second network device may be a master base station connected to the terminal device. In this embodiment of this application, the first network device may send the third preset threshold to the second network device, so that the second network device detects the mobility problem of the terminal device based on the third preset threshold.

In a possible design, the method further includes: The first network device sends to the second network device, one or more of an identifier of the first network device corresponding to the third preset threshold and an identifier of a cell corresponding to the third preset threshold.

According to a seventh aspect, an embodiment of this application provides a communication apparatus. The communication apparatus may be a network device, an apparatus (for example, a chip or a circuit) in a network device, or an apparatus that can coordinate with a network device. In a design, the communication apparatus may include modules that one-to-one correspond to the methods/operations/steps/actions described in the first aspect, the third aspect, the fourth aspect, or the sixth aspect. The modules may be hardware circuits or software, or may be implemented by a combination of the hardware circuits and the software.

In a design, the communication apparatus may include a receiving unit and a processing unit.

The receiving unit is configured to receive first indication information from a second network device, where the first indication information is used to indicate that a terminal device is successfully handed over from a third network device to the first network device or that the third network device has released a context of the terminal device. The processing unit is configured to detect a mobility problem based on the first indication information.

Alternatively, in another design, the communication apparatus may include a processing unit, a receiving unit, and a sending unit.

For example, the processing unit is configured to determine that a terminal device is synchronized to a first network device. The receiving unit is configured to receive second indication information from a second network device, where the second indication information is used to indicate a radio link failure between the terminal device and the first network device. The sending unit is configured to: if duration between a moment at which the communication apparatus receives the second indication information and a moment at which the terminal device is synchronized to the first network device falls within a second preset threshold, send third indication information to the second network device, where the third indication information is used to indicate that secondary network device change of the terminal device is too early. Alternatively, in another implementation, the processing unit is configured to determine that secondary network device reconfiguration of a terminal device is completed. The receiving unit is configured to receive second indication information from a second network device, where the second indication information is used to indicate a radio link failure between the terminal device and a first network device. The sending unit is configured to: if duration between the moment at which the communication apparatus receives the second indication information and the moment at which the secondary network device reconfiguration of the terminal device is completed falls within a second preset threshold, send third indication information to the second network device, where the third indication information is used to indicate that secondary network device change of the terminal device is too early.

Optionally, the receiving unit may be implemented by using a receiver. The receiver may be a receiving circuit, an interface circuit, or the like. The processing unit may be implemented by using a processor. Optionally, the communication apparatus may further include a sending unit. The sending unit may be implemented by using a transmitter. The transmitter may be a transmitting circuit, an interface circuit, or the like. The communication apparatus may further include a storage unit. The storage unit may be implemented by using a memory, configured to store a computer program or data.

In another design, the communication apparatus may include a processing unit and a sending unit. The processing unit is configured to generate a third preset threshold. The sending unit is configured to send the third preset threshold to a second network device, where the third preset threshold is used by the second network device to detect a mobility problem of a terminal device.

According to an eighth aspect, an embodiment of this application provides a communication apparatus. The communication apparatus may be a network device, an apparatus (for example, a chip or a circuit) in a network device, or an apparatus that can coordinate with a network device. In a design, the communication apparatus may include modules that one-to-one correspond to the methods/operations/steps/actions described in the second aspect or the fifth aspect. The modules may be hardware circuits or software, or may be implemented by a combination of the hardware circuits and the software.

In a design, the communication apparatus may include a processing unit and a sending unit.

The processing unit is configured to generate first indication information, where the first indication information is used to indicate that a terminal device is successfully handed over from a third network device to a first network device or that the third network device has released a context of the terminal device.

The sending unit is configured to send the first indication information to the first network device, where the first indication information is used by the first network device to detect a mobility problem.

In another design, the communication apparatus may include a receiving unit and a processing unit.

The receiving unit is configured to receive a third preset threshold from a first network device. The processing unit is configured to detect a mobility problem of a terminal device based on the third preset threshold.

Optionally, the receiving unit may be implemented by using a receiver. The receiver may be a receiving circuit, an interface circuit, or the like. The processing unit may be implemented by using a processor. Optionally, the communication apparatus may further include a storage unit. The storage unit may be implemented by using a memory, configured to store a computer program or data.

According to a ninth aspect, an embodiment of this application provides another communication apparatus, configured to perform the data transmission method described in the first aspect, the third aspect, the fourth aspect, or the sixth aspect. The communication apparatus may include: a memory, a processor coupled to the memory, a transmitter, and a receiver. For example, the transmitter is configured to support the communication apparatus to perform the step of sending information by the first network device in the data transmission method provided in the first aspect, the third aspect, the fourth aspect, or the sixth aspect. The receiver is configured to support the communication apparatus to perform the step of receiving information by the first network device in the data transmission method provided in the first aspect, the third aspect, the fourth aspect, or the fifth aspect. The processor is configured to support the communication apparatus to perform a processing step of the first network device other than sending information and receiving information in the data transmission method provided in the first aspect, the third aspect, the fourth aspect, or the sixth aspect. It should be noted that the transmitter and the receiver in this embodiment of this application may be integrated, or may be coupled by using a coupler. The memory is configured to store program instructions of the data transmission method described in the first aspect, the third aspect, or the fourth aspect. The processor is configured to execute the program instructions stored in the memory, so that the communication apparatus performs the data transmission method provided in the first aspect, the third aspect, the fourth aspect, or the sixth aspect. The memory and the processor may be integrated, or may be coupled by using a coupler.

According to a tenth aspect, an embodiment of this application provides another communication apparatus, configured to perform the data transmission method described in the second aspect or the fifth aspect. The communication apparatus may include: a memory, a processor coupled to the memory, a transmitter, and a receiver. For example, the transmitter is configured to support the communication apparatus to perform the step of sending information by the second network device in the data transmission method provided in the second aspect or the fifth aspect. The receiver is configured to support the communication apparatus to perform the step of receiving information by the second network device in the data transmission method provided in the second aspect or the fifth aspect. The processor is configured to support the communication apparatus to perform a processing step of the second network device other than sending information and receiving information in the data transmission method provided in the second aspect or the fifth aspect. It should be noted that the transmitter and the receiver in this embodiment of this application may be integrated, or may be coupled by using a coupler. The memory is configured to store program instructions of the data transmission method described in the second aspect or the fifth aspect. The processor is configured to execute the program instructions stored in the memory, that is, perform the data transmission method provided in the second aspect or the fifth aspect. The memory and the processor may be integrated, or may be coupled by using a coupler.

According to an eleventh aspect, an embodiment of this application provides a communication system, including a first network device and a second network device. For example, the first network device may be the communication apparatus described in the seventh aspect or the ninth aspect. The second network device may be the communication apparatus described in the eighth aspect or the tenth aspect. Optionally, the communication system may further include a third network device. Optionally, the communication system may further include a terminal device.

According to a twelfth aspect, an embodiment of this application provides a computer-readable storage medium. The readable storage medium stores instructions. When the instructions are run on a computer, the computer is enabled to perform the data transmission method described in any one of the foregoing aspects.

According to a thirteenth aspect, an embodiment of this application provides a computer program product that includes instructions. When the computer program product runs on a computer, the computer is enabled to perform the data transmission method described in any one of the foregoing aspects.

According to a fourteenth aspect, an embodiment of this application provides a communication chip. The communication chip may include a processor and one or more interfaces coupled to the processor. For example, the processor may be configured to invoke, from a memory, a program for implementing the data transmission method provided in any one of the foregoing aspects, and execute instructions included in the program. The interface may be configured to output a processing result of the processor.

BRIEF DESCRIPTION OF THE DRAWINGS

To describe technical solutions in embodiments of this application or in the background more clearly, the following describes the accompanying drawings for describing the embodiments of this application or the background.

FIG. 9 is a schematic flowchart of another data transmission method according to an embodiment of this application;

FIG. 10 is a schematic flowchart of another data transmission method according to an embodiment of this application;

DETAILED DESCRIPTION OF ILLUSTRATIVE EMBODIMENTS

Terms used in the embodiments of this application are merely used to explain specific embodiments of this application, but are not intended to limit this application.

Figure 1:
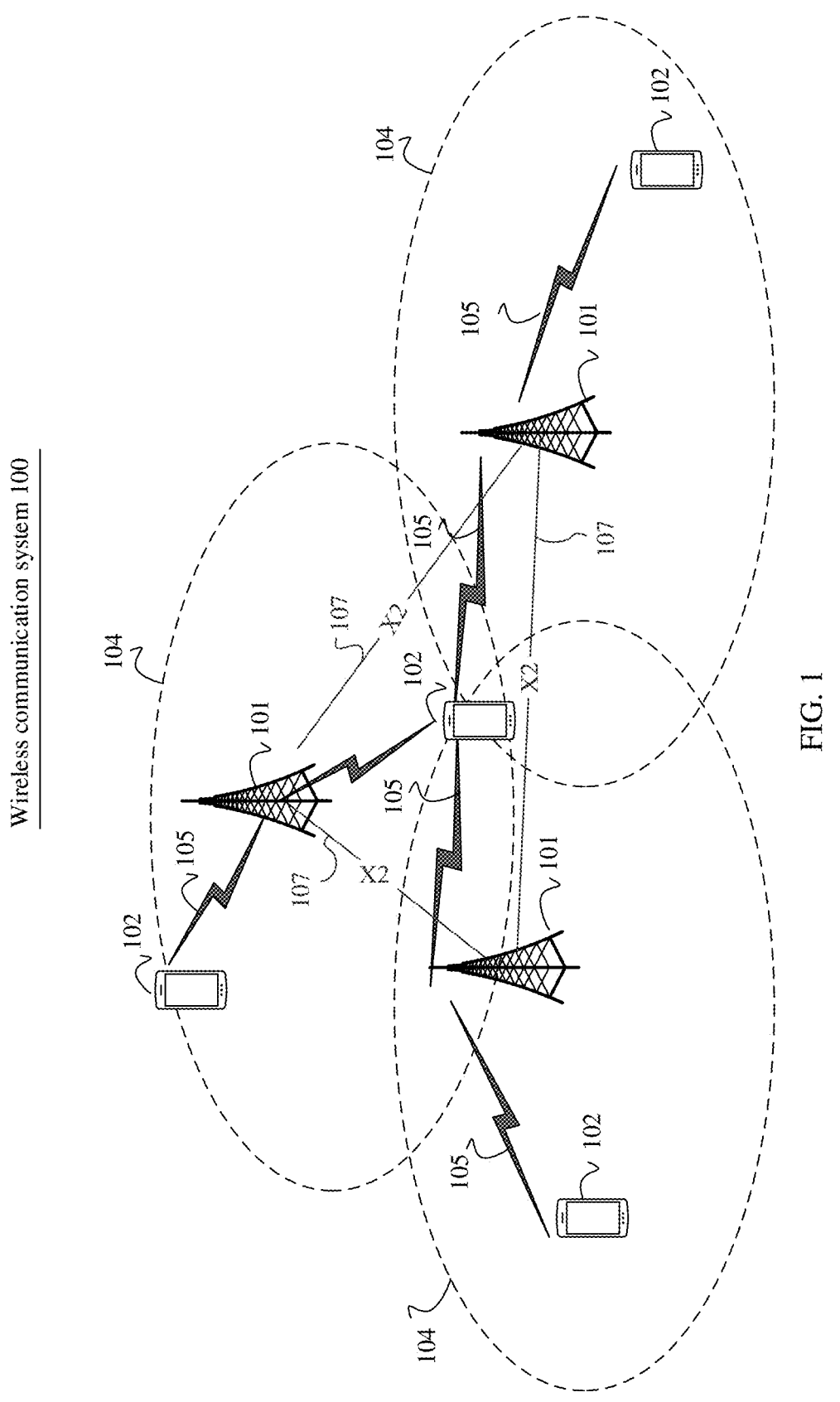
FIG. 1 is a diagram of an architecture of a wireless communication system according to an embodiment of this application.

FIG. 1 shows a wireless communication system according to an embodiment of this application. The wireless communication system 100 includes a communication device, and the communication device may perform wireless communication by using air interface resources. The communication device may include a network device 101 and a terminal device 102, and the network device 101 may also be referred to as a network side device. In this embodiment of this application, there are one or more network devices 101, and one or more terminal devices 102. The air interface resources may include at least one of time domain resources, frequency domain resources, code domain resources, and space domain resources.

The network device 101 may perform wireless communication with the terminal device 102 through one or more antennas. Each network device 101 may provide communication coverage for a coverage area 104 corresponding to each network device 101. The coverage area 104 corresponding to the network device 101 may be divided into a plurality of sectors (or cells), where one sector corresponds to a part of coverage area (not shown). The network device 101 may communicate with the terminal device 102 through a radio air interface 105. Alternatively, network devices 101 may directly or indirectly communicate with each other through an interface 107 (for example, an X2/Xn interface).

The terminal device 102 in the embodiments of this application may also be referred to as a terminal, and may be a device having a wireless transceiver function. The terminal device 102 may be deployed on land, which may be an indoor device, an outdoor device, a handheld device, or a vehicle-mounted device. Alternatively, the terminal device 102 may be deployed on a water surface (for example, on a ship) or deployed in the air (for example, on an airplane, a balloon, or a satellite). The terminal device may be user equipment (UE). The UE may be a handheld device, a vehicle-mounted device, a wearable device, or a computing device having a wireless communication function. For example, the UE may be a machine type communication (MTC) terminal, a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus configured to implement terminal functions may be a terminal, or may be an apparatus that can support the terminal to implement the functions, for example, a chip system. The apparatus may be installed in the terminal. In the embodiments of this application, the chip system may include a chip, or may include a chip and another discrete component. In the technical solutions provided in the embodiments of this application, the technical solutions provided in the embodiments of this application are described by using an example in which the apparatus for implementing terminal functions is a terminal and the terminal is UE.

The network device in the embodiments of this application may be a base station (BS), and may be a device deployed in a radio access network capable of performing wireless communication with the terminal. The base station may be in a plurality of forms, such as a macro base station, a micro base station, a relay station, and an access point. For example, the base station in the embodiments of this application may be a base station in 5G or a base station in LTE. The base station in 5G may also be referred to as a transmission reception point (TRP) or a next-generation node (gNB). In the embodiments of this application, an apparatus configured to implement network device functions may be a network device, or may be an apparatus that can support the network device to implement the functions, for example, a chip system. The apparatus may be installed in the network device. In the technical solutions provided in the embodiments of this application, the technical solutions provided in the embodiments of this application are described by using an example in which the apparatus for implementing network device functions is a network device and the network device is a base station.

In this application, the wireless communication system 100 is not limited to a long term evolution (LTE) system, and may be alternatively a 5G system (NR system), a wireless high fidelity (wireless fidelity, Wi-Fi) system, or the like. The wireless communication system 100 may be alternatively an internet of things (IoT) system, a machine type communication (MTC) system, a massive machine type communication (mMTC) system, an enhanced machine type communication (eMTC) system, or the like.

The technical solutions provided in the embodiments of this application may be applied to wireless communication between communication devices. The wireless communication between communication devices may include but is not limited to: wireless communication between a network device and a terminal, wireless communication between network devices, and wireless communication between terminals. In the embodiments of this application, the term "wireless communication" may be referred to as "communication" for short, and the term "communication" may also be described as "data transmission", "information transmission", or "transmission". For example, performing data transmission between a network device and a terminal includes: The network device sends a signal to the terminal, and/or the terminal sends a signal to the network device. The technical solutions may be used to perform wireless communication between a scheduling entity and a subordinate entity. A person skilled in the art may use the technical solutions provided in the embodiments of this application to perform wireless communication between another scheduling entity and the subordinate entity, for example, wireless communication between a macro base station and a micro base station, for example, wireless communication between a first terminal and a second terminal.

It should be noted that the terms "system" and "network" may be used interchangeably in the embodiments of this application. A signal may also be described as a sequence, data, or the like. "At least one" may also be described as "one or more", and "a plurality of" may be two, three, four, or more. This is not limited in this application. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

Figure 2:
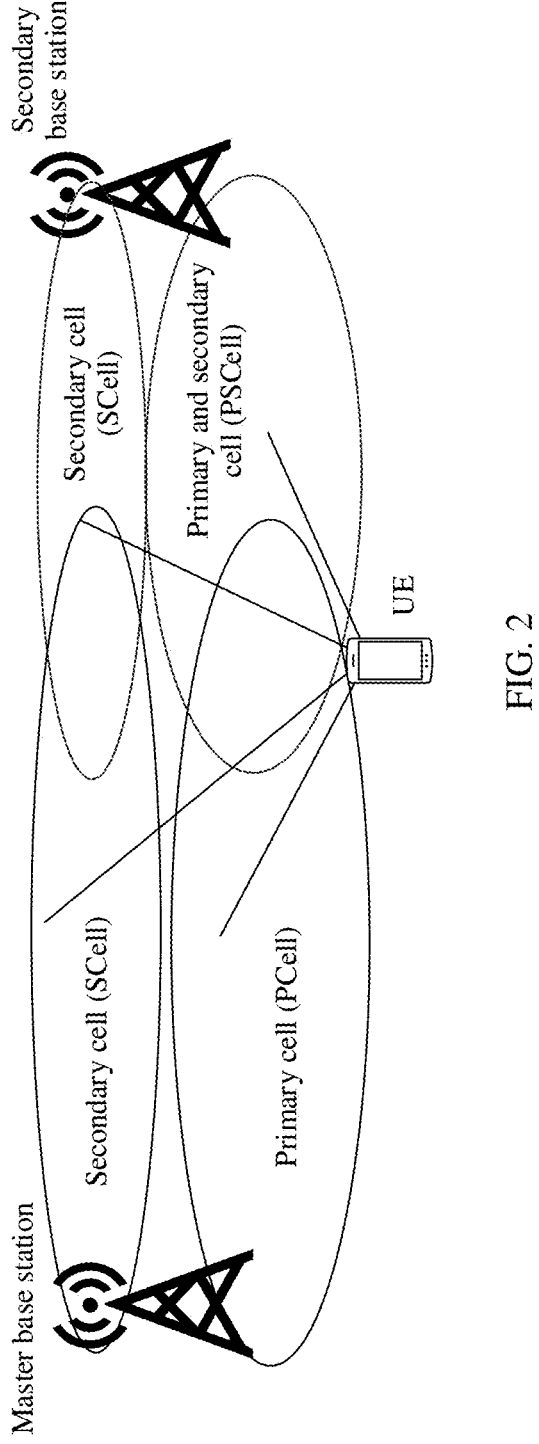
FIG. 2 is a schematic diagram of dual connectivity according to an embodiment of this application.

In the embodiments of this application, multi-radio dual connectivity (MR-DC) or dual-connectivity (DC) may be configured for the terminal device 102. For example, a terminal device may be communicatively connected to two radio access network devices and can receive and send data. This is referred to as dual connectivity. In the two radio access network devices, one may be referred to as a master base station (master node, MN) or a master node, which is responsible for exchanging radio resource control messages with the terminal device and interacting with core network control plane entities; and the other radio access network device may be referred to as a secondary base station (secondary node, SN) or a secondary node. Similarly, if a terminal device may be communicatively connected to a plurality of radio access network devices and can receive and send data, this may be referred to as multi-radio dual connectivity. In the plurality of radio access network devices, there may be an MN, which is responsible for exchanging radio resource control messages with the terminal device and interacting with core network control plane entities; and the remaining radio access network devices may be referred to as SNs. In the embodiments of this application, an example in which dual connectivity is configured for the terminal device 102 and the network device is a base station is used for description. In DC mode, the terminal device 102 may be connected to two serving base stations: a master base station and a secondary base station. Refer to FIG. 2. Serving cells of the terminal device 102 serving by the master base station include a primary cell (PCell) and 0 to n (where n is a positive integer) secondary cells (SCells). A serving cell group of the terminal device 102 serving by the master base station is referred to as a master cell group (MCG). Serving cells of the terminal device 102 of the secondary base station include a primary secondary cell PSCell and 0 to n secondary cells SCells. A serving cell group of the terminal device 102 serving by the secondary base station is referred to as a secondary cell group (SCG).

Figure 3A:
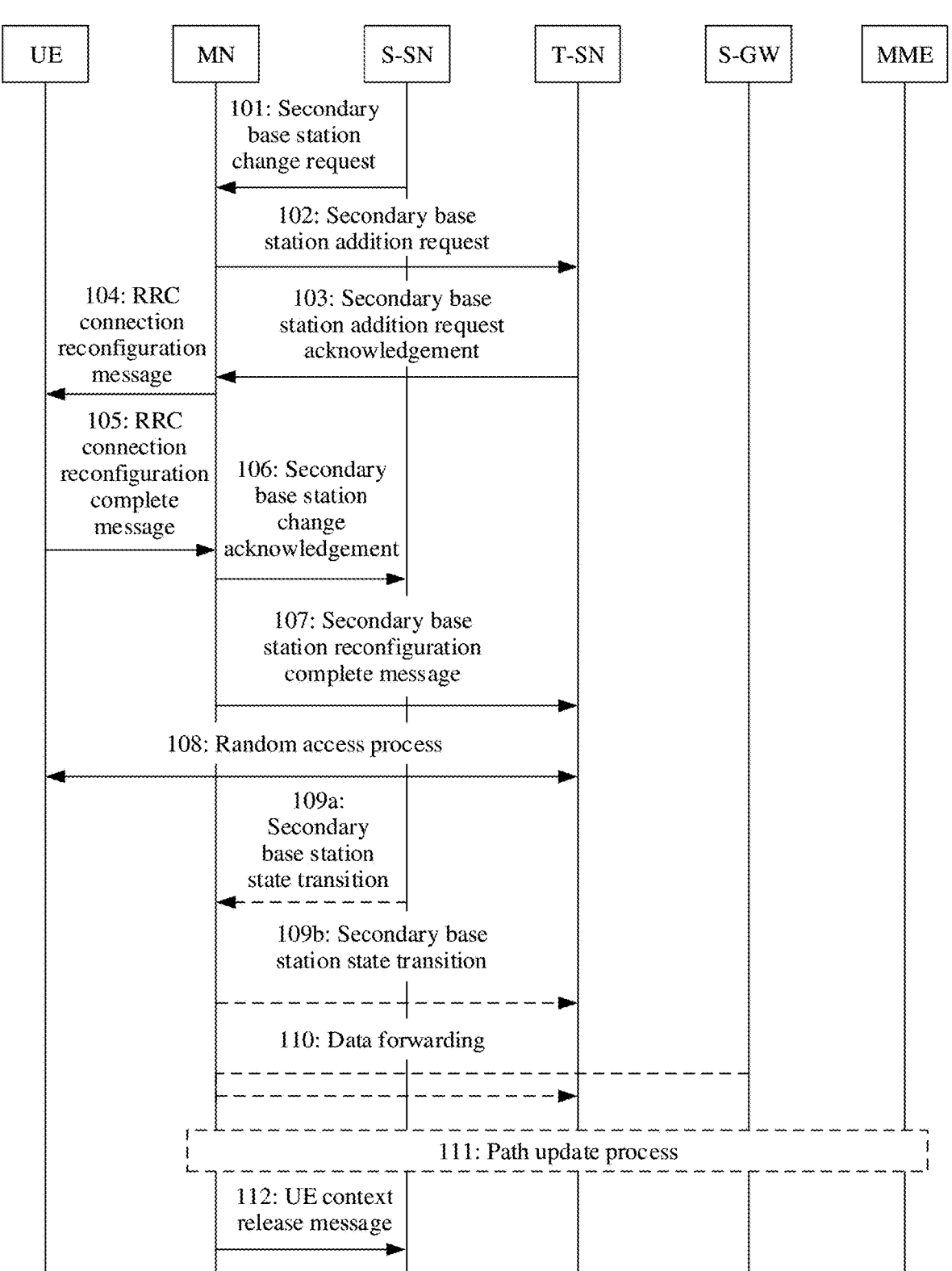
FIG. 3A is a schematic diagram of a secondary base station change process according to an embodiment of this application.

For an MR-DC scenario in an NR system, to support a secondary base station change scenario, an MN or a source SN connected to UE may trigger the UE to be handed over from the source SN (source secondary node, S-SN) to a target SN (target secondary node, T-SN). In a dual connectivity data transmission architecture in NR, an SN (secondary base station) change procedure may be shown in FIG. 3A and FIG. 3B. FIG. 3A shows a secondary base station change procedure triggered by an SN, and FIG. 3B shows a secondary base station change procedure triggered by an MN.

As shown in FIG. 3A, step 101: A source SN (S-SN) sends a secondary base station update request to an MN. Optionally, the secondary base station update request carries identification information of a target secondary base station. Step 102: The MN sends a secondary base station addition request to the target SN (T-SN), to request the target secondary base station to allocate a resource to a terminal device. Step 103: The T-SN sends a secondary base station addition request acknowledgment message to the MN, where the acknowledgment message includes radio resource control (RRC) configuration information. Step 104: The MN sends an RRC connection reconfiguration message to the UE to indicate a new configuration to the UE. Step 105: The UE sends an RRC connection reconfiguration complete message to the MN, and the UE applies the new RRC configuration. Step 106: If the target SN successfully allocates a resource, the MN determines to release a resource of the source SN, and sends a secondary base station change acknowledgment message to the S-SN. If data forwarding is required, step 110 is performed. Step 107: If the RRC connection reconfiguration procedure succeeds, the MN sends a secondary base station reconfiguration complete message to the T-SN. Step 108: The UE is synchronized to the target SN, that is, the UE performs a random access process with the T-SN. Steps 109a and 109b: For a SN-terminated bearer that uses a radio link control (RLC) acknowledgment mode (AM), the S-SN sends a secondary base station state transfer message to the MN, and the MN sends the secondary base station state transfer message to the T-SN. Step 110: If applicable, a data forwarding process needs to be performed, that is, data is forwarded from the S-SN, and the S-SN may initiate the request when receiving the secondary base station change acknowledgment message sent by the MN. Step 111: If one of bearers is terminated on the source SN, the MN triggers execution of a path update process. Step 112: The MN sends a UE context release message to the S-SN. After the S-SN receives the UE context release message, the S-SN may release UE context-related radio and control plane resources, and any ongoing data forwarding may continue.

Figure 3B:
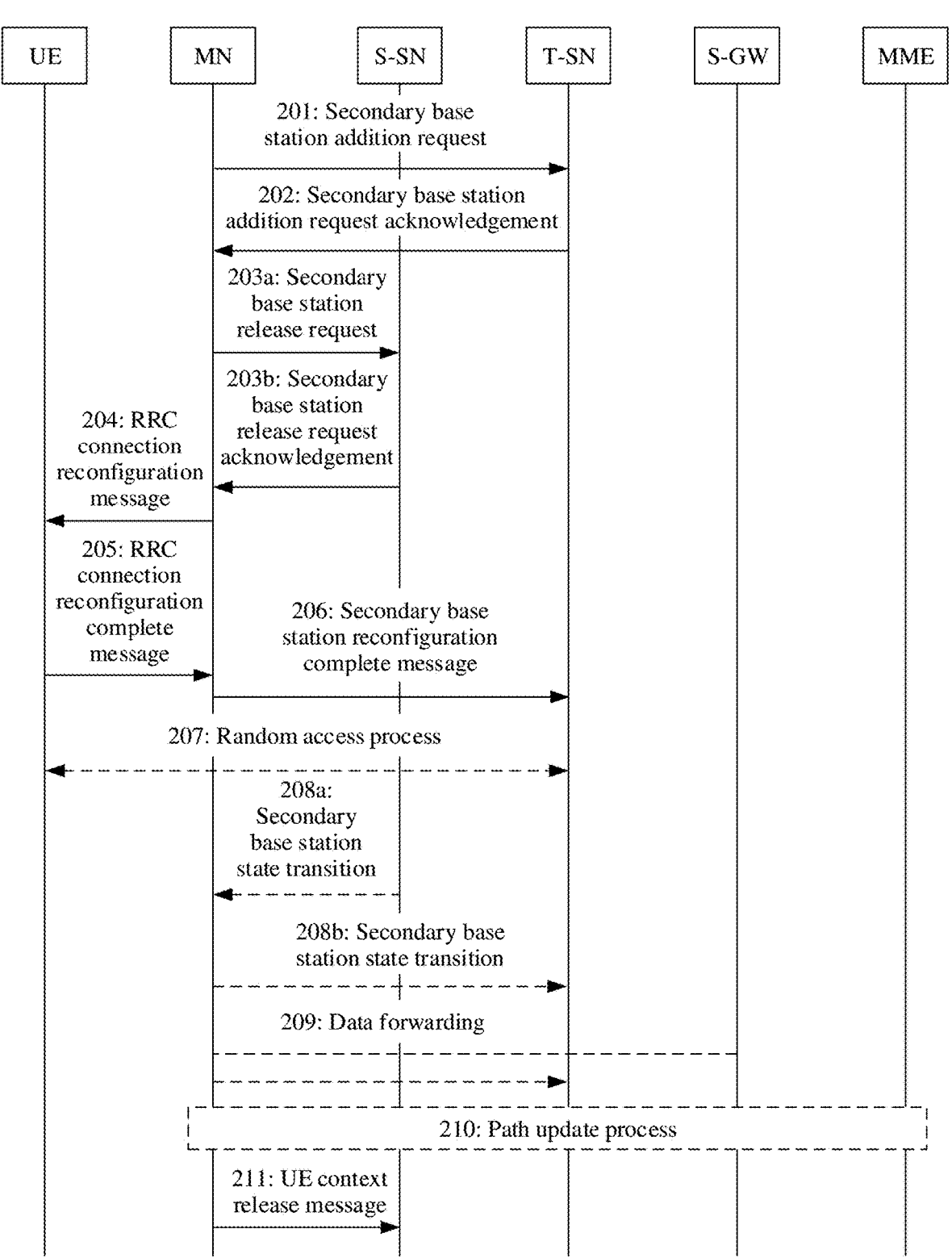
FIG. 3B is a schematic diagram of another secondary base station change process according to an embodiment of this application.

As shown in FIG. 3B, step 201: An MN sends a secondary base station addition request to a target SN (T-SN). Step 202: The T-SN sends a secondary base station addition request acknowledgment message to the MN. Step 203*a*: The MN sends a secondary base station release request to an S-SN. Step 203*b*: The S-SN sends a secondary base station release request acknowledgment message to the MN, where the acknowledgment message includes RRC configuration information. Step 204: The MN sends an RRC connection reconfiguration message to a UE to indicate a new configuration to the UE. Step 205: The UE sends an RRC connection reconfiguration complete message to the MN, and the UE applies the new RRC configuration. Step 206: If the RRC connection reconfiguration procedure succeeds, the MN sends a secondary base station reconfiguration complete message to the T-SN. Step 207: The UE is synchronized to the target SN, that is, the UE performs a random access process with the T-SN. Steps 208*a* and 208*b*: For a SN-terminated bearer that uses an RLC AM, the S-SN sends a secondary base station state transfer message to the MN, and the MN sends the secondary base station state transfer message to the T-SN. Step 209: If applicable, a data forwarding process needs to be performed, that is, data is forwarded from the S-SN, and the S-SN may initiate the request when receiving the secondary base station change acknowledgment message sent by the MN. Step 210: If one of bearers is terminated on the source SN, the MN triggers execution of a path update process, that is, a bearer modification procedure. Step 211: The MN sends a UE context release message to the S-SN. After the S-SN receives the UE context release message, the S-SN may release UE context-related radio and control plane resources, and any ongoing data forwarding may continue.

Figure 4:
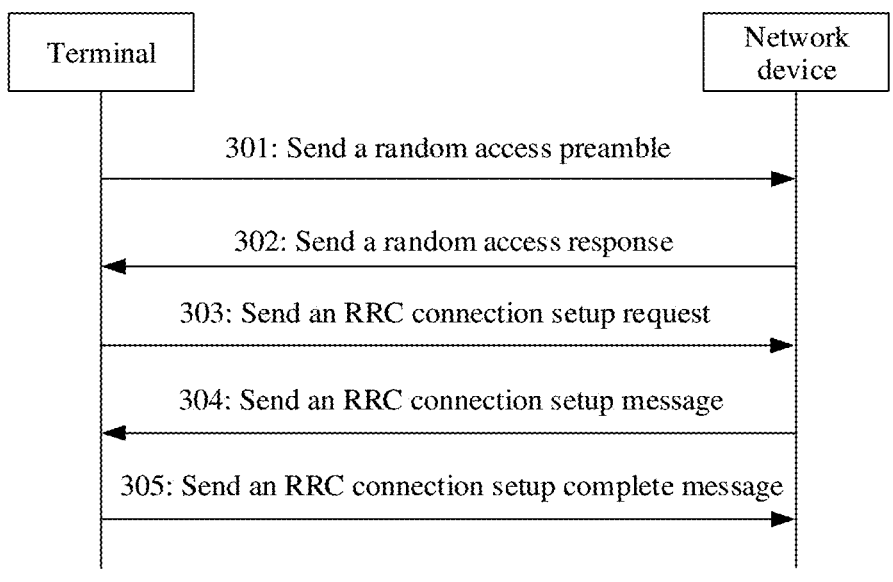
FIG. 4 is a schematic diagram of a random access process according to an embodiment of this application.

The random access process shown in step 108 in FIG. 3A or step 207 in FIG. 3B may be 4-step random access or 2-step random access. This is not limited in the embodiments of this application. The following describes in detail the 4-step random access process. For the random access process, refer to FIG. 4.

Step 301: UE sends a random access preamble message (also referred to as msg1) to a network device (for example, a gNB), where the preamble message includes a random access preamble selected by the UE.

Step 302: After receiving the preamble sent by the UE, the network device sends a radio resource control (RRC) random access response (also referred to as msg2) to the UE in a random access response window.

Step 303: After receiving the RRC random access response, the UE sends an RRC connection setup request (also referred to as msg3) on an uplink resource allocated by the network device.

Step 304: The network device sends an RRC connection setup message (also referred to as msg4) to the UE.

Step 305: After contention resolution is completed, the UE establishes a signaling radio bearer based on information in the RRC connection setup message, and sends an RRC connection setup complete message to the network device.

In an SN change scenario, inappropriate configuration of a change parameter may cause a radio link failure between the UE and a target SN. The change parameter includes at least one of a quality threshold, hysteresis time, trigger time, a threshold deviation, and the like. The inappropriate configuration of the change parameter may trigger too early SN change (too early change), too late SN change (too late change), SN change to wrong cell (change to wrong cell), or the like. There are two too early change scenarios. One scenario is that UE is not successfully handed over from a source SN to a target SN. The other scenario is that UE is successfully handed over from a source SN to a target SN, but an SCG radio link fault occurs soon thereafter. Subsequently, optionally, an MN may decide for the UE, so that the UE establishes a radio link connection to the source SN, selects a new SN to establish a radio link, or does not select any SN to establish a radio link. Too late change means that an SCG radio link fault occurs after UE stays in a cell of a source SN for a long time, but the UE does not receive an SN change command before this. Subsequently, optionally, an MN decides for the UE, so that the UE establishes a radio link connection to another SN, selects a new SN to establish a radio link, or does not select any SN to establish a radio link. There are two change to wrong cell scenarios. One scenario is that UE is not successfully handed over from a source SN to a target SN. The other scenario is that UE is successfully handed over from a source SN to a target SN, but an SCG radio link fault occurs soon thereafter. Subsequently, an MN decides for the UE, so that the UE establishes a radio link connection to an SN other than the source SN and the target SN. The SN change to wrong cell scenario may also belong to the too early SN change scenario.

It should be noted that in the embodiments of this application, "soon" may be understood as "very short" or "very soon", and may be understood as a relatively short period of time. A specific length of the period of time is not limited in the embodiments. For example, a value of the period of time corresponding to "soon" may be less than 10 ms, that is, a radio link failure occurs within 10 ms after a terminal device is successfully handed over from a source SN to a target SN.

It should be noted that, in the embodiments of this application, "long time" may be a relatively long period of time, namely, relatively long duration. A specific length of the "long time" is not limited in the embodiments. For example, a value of the "long time" may be greater than 1 s, that is, a radio link failure occurs after a terminal device is connected to a target SN for at least 1 s.

In the embodiments of this application, "a radio link failure between a terminal device and a target SN" may also be referred to as "a radio connection failure occurs between a terminal device and a target SN", "a connection failure occurs on a radio link of a target SN", "a connection failure occurs on a radio link of an SCG on a target SN", or "a connection failure occurs on a radio link between a terminal device and an SCG on a target SN". However, this is not limited in the embodiments of this application. For example, that a connection failure occurs on an SCG on a target SN in the embodiments of this application may mean that a connection failure occurs on a radio link between a terminal device and a cell in a target SN.

In the embodiments of this application, the radio link failure may include an SCG failure.

In the embodiments of this application, a connection failure cause may include at least one of the following: an SN change failure, a radio link failure (RLF), a reconfiguration synchronization failure, a failure of handover from new radio (new radio, NR) to another system, an integrity check failure, an RRC connection reconfiguration failure, or the like. This is not limited in the embodiments of this application.

In the embodiments of this application, a master base station may also be referred to as a master station, an MeNB, or an MgNB; and a secondary base station may also be referred to as a secondary station, an SeNB, or an SgNB. The master base station may be a base station in an LTE system, an NR system, a future evolved radio network system, or the like. The secondary base station may be a base station in an LTE system, an NR system, a future evolved radio network system, or the like.

Currently, there is no specific method for detecting too early SN change and SN change to wrong cell in a multi-radio dual connectivity data transmission scenario in the protocol. Therefore, how to detect the too early SN change (too early SN change) or change to wrong cell is a technical problem that needs to be resolved.

In the embodiments of this application, a mobility problem may also be referred to as a change failure event, a radio link failure event, a radio connection failure event, or the like. For example, the mobility problem may be too early secondary base station change, too late secondary base station change, or change to wrong cell (or change to wrong SN).

Figure 5:
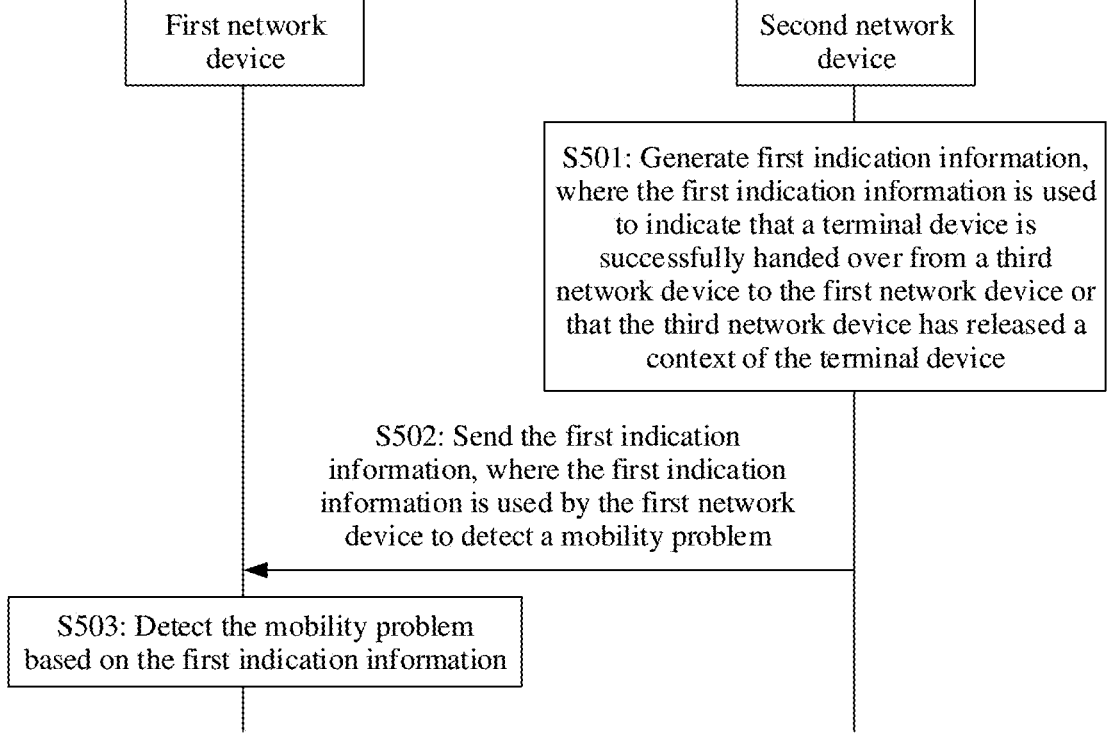
FIG. 5 is a schematic flowchart of a data transmission method according to an embodiment of this application.

Based on the foregoing wireless communication system 100, an embodiment of this application provides a data transmission method. Refer to FIG. 5. The data transmission method includes but is not limited to the following steps.

S501: A second network device generates first indication information, where the first indication information is used to indicate that a terminal device is successfully handed over from a third network device to a first network device or that the third network device has released a context of the terminal device.

S502: The second network device sends the first indication information to the first network device, and the first network device receives the first indication information from the second network device, where the first indication information is used by the first network device to detect a mobility problem.

S503: The first network device detects the mobility problem based on the first indication information.

In this embodiment of this application, the network device may be a base station, or a software module, a hardware circuit, a chip, a chip system, or another component in the base station. The second network device may be but is not limited to a master base station (MN) connected to the terminal device. The third network device may be but is not limited to a source secondary base station (S-SN) connected to the terminal device before secondary base station change. The first network device may be but is not limited to a target secondary base station (T-SN) after the terminal device is handed over. This embodiment of this application is described by using an example in which the first network device is a target secondary base station of UE, the second network device is a master base station of the UE, and the third network device is a source secondary base station of the UE.

In this embodiment of this application, before the master base station sends the first indication information to the target secondary base station, the method may further include: The master base station sends a UE context release message to the source secondary base station (that is, step 112 in FIG. 3A or step 211 in FIG. 3B). The source secondary base station releases a context of the UE based on the UE context release message.

Optionally, for a secondary base station change procedure triggered by an SN, before the master base station sends a UE context release message to the source secondary base station, the method may further include: The terminal device is synchronized to the target secondary base station. That the terminal device is synchronized to the target secondary base station may also be understood as that the target secondary base station completes a random access process with the terminal device (that is, step 108 in FIG. 3A). Alternatively, that the terminal device is synchronized to the target secondary base station may be understood as that the target secondary base station receives an RRC connection setup complete message sent by the UE. After the terminal device is synchronized to the target secondary base station, the master base station performs a bearer (bearer) modification procedure with the terminal device, for example, step 111 in FIG. 3A.

Optionally, for a secondary base station change procedure triggered by an MN, before the master base station sends a UE context release message to the source secondary base station, the method may further include a secondary base station reconfiguration process of the terminal device (that is, step 206 in FIG. 3B). That secondary base station reconfiguration of the terminal device is completed may also be understood as that the target secondary base station receives a secondary base station reconfiguration complete message sent by the master base station. After the secondary base station reconfiguration is completed, the master base station performs a bearer modification procedure with the terminal device, for example, step 210 in FIG. 3B.

After sending the context release message of the terminal device to the source secondary base station, the master base station sends the first indication information to the target secondary base station, to indicate that the source secondary base station has released the context of the terminal device, or indicate that the terminal device is successfully handed over from the source secondary base station to the target secondary base station. The indicating that the source secondary base station has released the context of the terminal device means that the master base station sends the context release message of the terminal device to the source secondary base station.

The target secondary base station may detect the mobility problem based on the first indication information. For example, for a process in which the target secondary base station detects the mobility problem, refer to FIG. 6. After step S502 and before step S503, the method may further include the following steps.

S504: The terminal device sends fourth indication information to the master base station, and the master base station receives the fourth indication information from the terminal device, where the fourth indication information is used to indicate a radio link failure between the terminal device and the target secondary base station.

S505: The master base station sends second indication information to the target secondary base station, and the target secondary base station receives the second indication information from the master base station, where the second indication information is used to indicate the radio link failure between the terminal device and the target secondary base station.

The second indication information includes content in the fourth indication information. Optionally, the second indication information may further include one or more of an identifier of a cell on which the radio link failure occurs, an identifier of the master base station, an identifier of the source secondary base station, and the like. This is not limited in this application. The fourth indication information may include radio link failure indication information, for example, a radio link failure report.

For example, step S503 may include: The target secondary base station determines, based on an interval between a receiving moment of the first indication information and a receiving moment of the second indication information, whether secondary base station change of the terminal device is too early. If duration between a moment at which the target secondary base station receives the second indication information and a moment at which the target secondary base station receives the first indication information falls within a first preset threshold, the target secondary base station determines that the secondary base station change of the terminal device is too early.

In a possible manner, after determining that the secondary base station change of the terminal device is too early, the target secondary base station may further perform step S506. S506: The target secondary base station sends third indication information to the master base station, and the master base station receives the third indication information from the target secondary base station, where the third indication information is used to indicate that the secondary base station change of the terminal device is too early.

Alternatively, the third indication information is used to indicate a radio link failure cause between the terminal device and the target secondary base station. For example, the radio link failure cause is that the secondary base station change of the terminal device is too early.

Optionally, the third indication information may further indicate one or more of a source cell identifier (for example, a cell global identifier (CGI), a physical cell identifier (PCI), or a cell frequency), an identifier of a cell on which the radio link failure occurs (for example, a CGI), an identifier of a terminal (for example, a cell radio network temporary identifier (CRNTI)), a radio link failure report, and the like. This is not limited in this embodiment of this application.

Optionally, if the master base station triggers the secondary base station change process, the master base station adjusts a mobility parameter based on the third indication information. If the source secondary base station triggers the secondary base station change process, the master base station may further send fifth indication information to the source secondary base station after receiving the third indication information, and the source secondary base station receives the fifth indication information from the master base station, where the fifth indication information is used to indicate that the secondary base station change of the terminal device is too early. Correspondingly, the secondary base station adjusts the mobility parameter based on the fifth indication information. For example, adjusting the mobility parameter means to adjust related parameters in events A5, A6, B1, and B2 in measurement report triggering events. Specifically, the related parameters may include one or more of a handover hysteresis parameter Hysteresis, a handover trigger time (Time-To-Trigger), and a handover offset (cell individual offset, CIO). This is not limited in this embodiment of this application.

In this embodiment of this application, the terminal device can detect whether a radio link failure occurs with the target secondary base station. The radio link failure includes at least one of the following: a radio link failure between the terminal device and a primary cell in the target secondary base station, a radio link failure between the terminal device and a special cell in the target secondary base station, or a radio link failure between the terminal device and all cells in the target secondary base station. The terminal device may detect a radio link failure based on that a timer expires that is started after a physical layer indicates that a radio problem occurs, a random access procedure failure, an RLC failure, or the like.

The fifth indication information may be a radio link failure report. The terminal device may report, to the master base station, a report about the radio link failure with the target secondary base station. After learning of the report, the master base station sends indication information about the radio link failure between the terminal device and the target secondary base station (that is, the second indication information) to the target secondary base station. The target secondary base station determines, by identifying whether the duration between the moment at which the second indication information is received and the moment at which the first indication information is received falls within the first preset threshold, whether the secondary base station change of the terminal device is too early. If the duration between the moment at which the target secondary base station receives the second indication information and the moment at which the target secondary base station receives the first indication information falls within the first preset threshold, the target secondary base station determines that the secondary base station change of the terminal device is too early. The target secondary base station sends, to the master base station, indication information indicating that the secondary base station change is too early (that is, the third indication information).

In an implementation, after receiving the first indication information from the master base station, the target secondary base station starts a timer, where timing duration of the timer is the first preset threshold. If the timer is still running when the target secondary base station receives the second indication information sent by the master base station, the target secondary base station determines that a cause for the radio link failure between the terminal device and the target secondary base station is too early secondary base station change. In this embodiment of this application, the first preset threshold may be a relatively short period of time. A specific length of the period of time is not limited in this embodiment. For example, a value of the period of time corresponding to the "first preset threshold" may be less than 10 ms.

In this embodiment of this application, an example in which the first preset threshold is configured on the secondary base station is used for description. Too early SN change may be defined as follows. A target cell to which the terminal device is handed over belongs to an SN 2, where the SN 2 is a target secondary base station other than a source secondary base station SN 1 to which a source cell belongs. After the SN 2 receives the second indication information sent by the master base station, if the target secondary base station SN 2 learns that the master base station has sent a UE context release message to the source secondary base station SN 1, or if the target secondary base station SN 2 receives an indication indicating that secondary base station change succeeds, that is, if the target secondary base station SN 2 receives the first indication information, if the timer (the timer is started after the SN 2 receives the first indication information, where timing duration of the timer is the first preset threshold) is still running at this time, the terminal device is handed over from the source secondary base station to the target secondary base station too early.

Alternatively, the too early SN change may be defined as follows. A target cell to which the terminal device is handed over belongs to an SN 2 other than an SN 1 to which a source cell belongs. After the SN 2 receives the second indication information sent by the master base station, if the target secondary base station SN 2 learns that the master base station has sent a UE context release message to the source secondary base station SN 1, or if the target secondary base station SN 2 receives an indication indicating that secondary base station change succeeds, that is, if the target secondary base station SN 2 receives the first indication information, if the first indication information is sent within the first preset threshold or if the first indication information is sent at the last timing moment within the first preset threshold (for example, the last timing moment is the last second recorded by the timer if duration of the timer is measured in a unit of seconds or at a granularity of seconds, or the last timing moment is the last millisecond recorded by the timer if duration of the timer is measured in a unit of milliseconds or at a granularity of milliseconds), optionally, if the first indication information is related to handover completion of the UE, the terminal device is handed over from the source secondary base station to the target secondary base station too early.

Alternatively, the too early SN change may be defined as follows. If a target cell to which the terminal device is handed over belongs to an SN 2 other than an SN 1 to which a source cell belongs, after the SN 2 receives the second indication information sent by the master base station, if the target secondary base station SN 2 learns that the master base station has sent a UE context release message to the source secondary base station SN 1, or if the target secondary base station SN 2 receives an indication indicating that secondary base station change succeeds, that is, if the target secondary base station SN 2 receives the first indication information, and there is same UE in the target secondary base station SN 2 ready for the secondary base station change, the terminal device is handed over from the source secondary base station to the target secondary base station too early. Optionally, the target SN may further determine whether the mobility problem of the terminal device is too early change or change to wrong SN, based on the first indication information and whether a secondary base station that the MN reselects for the terminal device after the radio link failure between the terminal device and the target SN occurs is a source SN or a new SN (that is, an SN other than the source SN and the target SN).

For example, after receiving the fourth indication information sent by the terminal device, the MN learns of the radio link failure between the terminal device and the target SN, and the MN reselects an SN for the terminal device. The MN sends an identifier of the reselected SN to the target SN, and the target SN learns whether the SN reselected by the MN for the terminal device is a source SN or a new SN. In this embodiment of this application, change to wrong SN may be defined as follows: If duration between a moment at which the target SN receives the second indication information and a moment at which the target SN receives the first indication information falls within the first preset threshold, and the SN reselected by the MN for the UE is a new SN, it is determined that the mobility problem of the terminal device is change to wrong SN. If the duration between the moment at which the target SN receives the second indication information and the moment at which the target SN receives the first indication information falls within the first preset threshold, and the SN reselected by the MN for the UE is a source SN, it is determined that the mobility problem of the terminal device is too early SN change.

Alternatively, after receiving the third indication information sent by the target SN, the MN may further detect whether the mobility problem of the terminal device is too early change or change to wrong SN. In this case, the change to wrong SN may be understood as a special case of the too early change. For example, if the MN receives the third indication information indicating that SN change for the terminal device is too early, and the MN determines that the mobility problem of the terminal device is too early change if the SN reselected by the MN for the terminal device is a source SN, or the MN determines that the mobility problem of the terminal device is change to wrong SN if the SN reselected by the MN for the terminal device is a new SN.

Optionally, the master base station may send the first indication information or the second indication information to the target secondary base station via an existing X2/Xn interface message, or may send the first indication information or the second indication information to the target secondary base station via a newly defined X2/Xn interface message. The target secondary base station may send the third indication information to the master base station via an existing X2/Xn interface message, or may send the third indication information to the master base station via a newly defined X2/Xn interface message. The master base station may send the fifth indication information to the source secondary base station via an existing X2/Xn interface message, or may send the fifth indication information to the source secondary base station via a newly defined X2/Xn interface message. This is not limited in this application. The terminal device may send the fourth indication information to the master base station through an air interface.

In this embodiment of this application, the first preset threshold may be configured by the target secondary base station, or configured by an operation administration and maintenance (OAM) device of the target secondary base station, or obtained by the target secondary base station from the master base station. If the first preset threshold is obtained by the target secondary base station from the master base station, the master base station may further send, in addition to sending the first preset threshold to the target secondary base station, an identifier of a secondary cell to which the first preset threshold is applicable, so that the target secondary base station identifies one or more specific secondary cells on the target secondary base station that the first preset threshold is specific for. It should be noted that, when the first preset threshold is obtained by the target secondary base station from the master base station, the first preset threshold may be configured by the OAM for the master base station or by the master base station. This is not limited in this embodiment of this application.

It should be noted that the preset threshold mentioned in this embodiment of this application may be a timer at a cell granularity, that is, different cells served by a same base station may correspond to separate time thresholds, and thresholds corresponding to different cells may be the same as or different from each other. Alternatively, the preset threshold may be a timer at a base station granularity, that is, different cells served by a same base station may correspond to a same time threshold.

It should be noted that a sequence of performing steps S502 and S504 is not limited.

This embodiment of this application may be applicable to the secondary base station change process of the UE triggered by the SN shown in FIG. 3A, or may be applicable to the secondary base station change process of the UE triggered by the MN shown in FIG. 3B.

In this embodiment of this application, after sending the UE context release message to the source secondary base station, the master base station may send the first indication information to the target secondary base station, to indicate that the secondary base station of the terminal device hands over from the source secondary base station to the target secondary base station (or to indicate that the source secondary base station releases the context of the terminal device). If a radio link failure occurs after the terminal device successfully accesses the target secondary base station, the terminal device may send the second indication information to the target secondary base station through the master base station, to indicate the radio link failure between the terminal device and the target secondary base station. The target secondary base station determines, based on the interval between the receiving moment of the first indication information and the receiving moment of the second indication information, whether the radio link failure cause is that the secondary base station change is too early, so that the master base station or the source secondary base station optimizes a mobility parameter of the secondary base station based on the radio link failure cause. This avoids a mobility failure caused by too early secondary base station change.

It should be noted that the first preset threshold, the second preset threshold, or the third preset threshold mentioned in this embodiment of this application and the following embodiments may be a storage time threshold of the context of the UE (tstore_UE_cntxt), or may be defined as another name, for example, a timer. This is not limited in this application.

Figure 6:
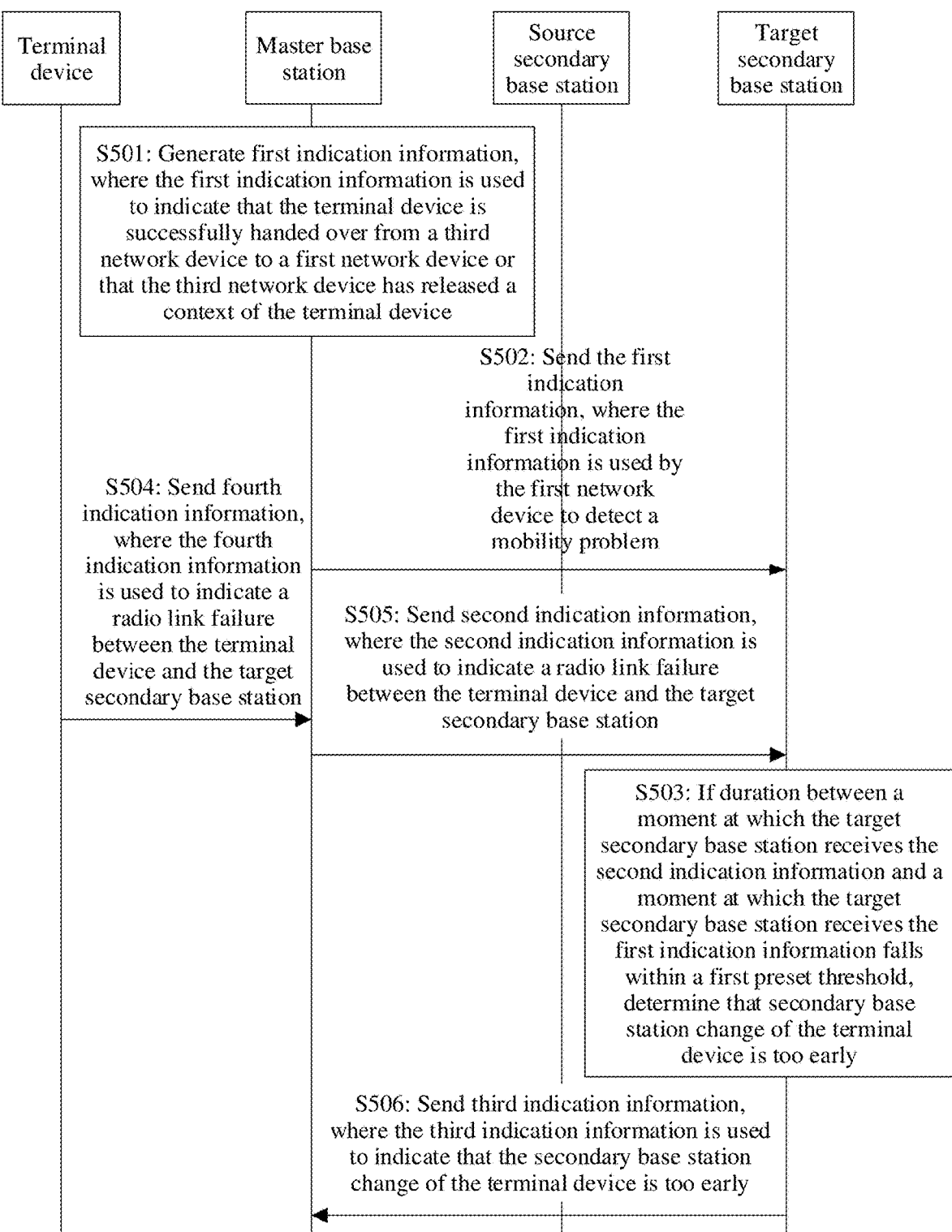
FIG. 6 is a schematic flowchart of another data transmission method according to an embodiment of this application.

In the embodiment shown in FIG. 6, the target secondary base station detects the mobility problem based on whether the an interval between a receiving moment of the first indication information and a receiving moment of the second indication information falls within the preset threshold. In another optional implementation, the target secondary base station may further detect the mobility problem based on whether an interval between a moment at which the terminal device is synchronized to the target secondary base station and a moment at which the second indication information is received falls within the preset threshold. For details, refer to FIG. 7.

S601: A target secondary base station determines that a terminal device is synchronized to the target secondary base station.

Specifically, this embodiment of this application may be applicable to the scenario shown in FIG. 3A in which an SN triggers secondary base station change of the UE. That a target secondary base station determines that a terminal device is synchronized to the target secondary base station may also be understood as that the target secondary base station completes a random access process with the terminal device. For example, the target secondary base station receives an RRC connection setup complete message sent by the terminal device.

S602: The terminal device sends fourth indication information to a master base station, and the master base station receives the fourth indication information from the terminal device, where the fourth indication information is used to indicate a radio link failure between the terminal device and the target secondary base station.

S603: The master base station sends second indication information to the target secondary base station, and the target secondary base station receives the second indication information from the master base station, where the second indication information is used to indicate the radio link failure between the terminal device and the target secondary base station.

S604: If duration between a moment at which the target secondary base station receives the second indication information and a moment at which the terminal device is synchronized to the target secondary base station falls within a second preset threshold, the target secondary base station sends third indication information to the master base station, and the master base station receives the third indication information from the target secondary base station, where the third indication information is used to indicate that secondary base station change of the terminal device is too early.

Alternatively, the third indication information is used to indicate a radio link failure cause between the terminal device and the target secondary base station. For example, the radio link failure cause is that the secondary base station change of the terminal device is too early.

S605: The master base station sends fifth indication information to a source secondary base station, and the source secondary base station receives the fifth indication information from the master base station, where the fifth indication information is used to indicate that the secondary base station change of the terminal device is too early.

After receiving the fifth indication information, the source secondary base station may adjust a mobility parameter based on the fifth indication information. For example, adjusting the mobility parameter based on the fifth indication information by the source secondary base station means to adjust related parameters in events A5, A6, B1, and B2 in measurement report triggering events. Specifically, the parameters may include one or more of a handover hysteresis parameter Hysteresis, a handover trigger time Time-To-Trigger, and a handover offset (cell individual offset, CIO). This is not limited in this embodiment of this application.

It should be noted that this embodiment of this application may be applicable to a split bearer scenario, that is, a scenario in which there is no bearer update process between the master base station and a core network (that is, step 109 to step 11 in FIG. 3A are not performed) in the secondary base station change process. This embodiment of this application may also be applicable to a scenario in which there is a bearer update process between the master base station and the core network. This is not limited in this application.

In this embodiment of this application, the terminal device can detect whether a radio link failure occurs with the target secondary base station. If a radio link failure occurs, the terminal device may report, to the master base station, a report about the radio link failure with the target secondary base station. After learning of the report, the master base station sends indication information about the radio link failure between the terminal device and the target secondary base station (that is, the second indication information) to the target secondary base station. The target secondary base station determines, by identifying whether duration between the moment at which the second indication information is received and a moment at which the RRC connection setup complete message is received falls within the second preset threshold, whether the secondary base station change of the terminal device is too early. If the duration between the moment at which the target secondary base station receives the second indication information and the moment at which the RRC connection setup complete message sent by the UE is received falls within the second preset threshold, the target secondary base station determines that the secondary base station change of the terminal device is too early. The target secondary base station sends, to the master base station, indication information indicating that the secondary base station change is too early (that is, the third indication information).

In an implementation, after receiving the RRC connection setup complete message from the terminal device, the target secondary base station starts a timer, where timing duration of the timer is the second preset threshold. If the timer is still running when the target secondary base station receives the second indication information sent by the master base station, the target secondary base station determines that a cause for the radio link failure between the terminal device and the target secondary base station is too early secondary base station change. In this embodiment of this application, the second preset threshold may be a relatively short period of time. A specific length of the period of time is not limited in this embodiment. For example, a value of the period of time corresponding to the "second preset threshold" may be less than 10 ms. The second preset threshold in this embodiment of this application may be equal or unequal to the first preset threshold in the foregoing embodiment.

In this embodiment of this application, an example in which the second preset threshold is configured on the target secondary base station is used for description. Too early SN change may be defined as follows. A target cell to which the terminal device is handed over belongs to an SN 2 other than an SN 1 to which a source cell belongs. After the SN 2 receives the second indication information sent by the master base station, if the SN 2 has received the RRC connection setup complete message sent by the UE, if the timer (the timer is started after the SN 2 receives the RRC connection setup complete message sent by the UE, where timing duration of the timer is the second preset threshold) is still running, the terminal device is handed over from the source secondary base station to the target secondary base station too early.

Alternatively, the too early SN change may be defined as follows. A target cell to which the terminal device is handed over belongs to an SN 2 other than an SN 1 to which a source cell belongs. After the SN 2 receives the second indication information sent by the master base station, if the SN 2 receives, within the second preset threshold, the RRC connection setup complete message sent by the UE, or if the SN 2 receives, at the last timing moment within the second preset threshold, the RRC connection setup complete message sent by the master base station (optionally, if the RRC connection setup complete message is related to handover completion of the UE), the terminal device is handed over from the source secondary base station to the target secondary base station too early.

Alternatively, the too early SN change may be defined as follows. If a target cell to which the terminal device is handed over belongs to an SN 2 other than an SN 1 to which a source cell belongs, after the SN 2 receives the second indication information sent by the master base station, if the SN 2 has received the RRC connection setup complete message sent by the UE, and there is same UE in the SN 2 ready for the secondary base station change, the terminal device is handed over from the source secondary base station to the target secondary base station too early.

In this embodiment of this application, the target SN may alternatively determine whether the mobility problem of the UE is too early SN change or change to wrong SN, based on whether the duration between the moment at which the second indication information is received and the moment at which the RRC connection setup complete message is received falls within the second preset threshold and based on whether an SN reselected by the MN for the UE is a source SN or a new SN. For a specific determining manner, refer to related descriptions in the embodiment shown in FIG. 5, and details are not described herein again.

For sending manners of the second indication information, the third indication information, the fourth indication information, and the fifth indication information, refer to the embodiment shown in FIG. 6. Details are not described herein again.

In this embodiment of this application, the second preset threshold may be started by the target secondary base station. Optionally, the second preset threshold may be configured by the target secondary base station, an OAM device of the target secondary base station, or the master base station. For example, the master base station sends the second preset threshold to the target secondary base station.

In this embodiment of this application, if a radio link failure occurs after the terminal device successfully accesses the target secondary base station, the terminal device may send the second indication information to the target secondary base station through the master base station, to indicate the radio link failure between the terminal device and the target secondary base station. The target secondary base station determines, based on an interval between a moment at which the second indication information is received and the moment at which the RRC connection setup complete message sent by the UE is received, whether the radio link failure cause is that the secondary base station change is too early, so that the source secondary base station optimizes a mobility parameter of the secondary base station based on the radio link failure cause. This avoids a mobility failure caused by too early secondary base station change.

This embodiment of this application may be further applied to a secondary base station change scenario triggered by an MN, in addition to the secondary base station change scenario triggered by the SN. The target secondary base station may further detect the mobility problem based on whether an interval between a moment at which secondary base station reconfiguration is complete and the moment at which the second indication information is received falls within a preset threshold. For details, refer to FIG. 8.

S701: A target secondary base station determines that secondary base station reconfiguration of a terminal device is completed.

Specifically, that a target secondary base station determines that secondary base station reconfiguration of a terminal device is completed is that, for example, the target secondary base station receives a secondary base station reconfiguration complete message (for example, an SgNB reconfiguration complete message) sent by a master base station.

S702: The terminal device sends fourth indication information to the master base station, and the master base station receives the fourth indication information from the terminal device, where the fourth indication information is used to indicate a radio link failure between the terminal device and the target secondary base station.

S703: The master base station sends second indication information to the target secondary base station, and the target secondary base station receives the second indication information from the master base station, where the second indication information is used to indicate the radio link failure between the terminal device and the target secondary base station.

S704: If duration between a moment at which the target secondary base station receives the second indication information and a moment at which the target secondary base station determines that the secondary base station reconfiguration of the terminal device is completed falls within a second preset threshold, the target secondary base station sends third indication information to the master base station, and the master base station receives the third indication information from the target secondary base station, where the third indication information is used to indicate that secondary base station change of the terminal device is too early.

Alternatively, the third indication information is used to indicate a radio link failure cause between the terminal device and the target secondary base station. For example, the radio link failure cause is that the secondary base station change of the terminal device is too early.

The master base station adjusts a mobility parameter based on the third indication information. For example, the adjusting a mobility parameter based on the third indication information means to adjust related parameters in events A5, A6, B1, and B2 in measurement report triggering events. Specifically, the parameters may include one or more of a handover hysteresis parameter Hysteresis, a handover trigger time Time-To-Trigger and a handover offset (cell individual offset, CIO). This is not limited in this embodiment of this application.

It should be noted that this embodiment of this application may be applicable to a split bearer scenario, that is, a scenario in which there is no bearer update process between the master base station and a core network (that is, step 208 to step 210 in FIG. 3B are not performed) in the secondary base station change process. This embodiment of this application may also be applicable to a scenario in which there is a bearer update process between the master base station and the core network. This is not limited in this application.

In an implementation, after receiving the secondary base station reconfiguration complete message sent by the master base station, the target secondary base station starts a timer, where timing duration of the timer is the second preset threshold. If the timer is still running when the target secondary base station receives the second indication information sent by the master base station, the target secondary base station determines that a cause for the radio link failure between the terminal device and the target secondary base station is too early secondary base station change. In this embodiment of this application, the second preset threshold may be a relatively short period of time. A specific length of the period of time is not limited in this embodiment. For example, a value of the period of time corresponding to the "second preset threshold" may be less than 10 ms. The second preset threshold in this embodiment of this application may be equal or unequal to the first preset threshold in the foregoing embodiment.

In this embodiment of this application, too early SN change may be defined as follows. A target cell to which the terminal device is handed over belongs to an SN 2 other than an SN 1 to which a source cell belongs. After the SN 2 receives the second indication information sent by the master base station, if the SN 2 has received the secondary base station reconfiguration complete message sent by an MN, if the timer (the timer is started after the SN 2 receives the secondary base station reconfiguration complete message sent by the MN, where timing duration of the timer is the second preset threshold) is still running, the terminal device is handed over from a source secondary base station to the target secondary base station too early.

Alternatively, the too early SN change may be defined as follows. A target cell to which the terminal device is handed over belongs to an SN 2 other than an SN 1 to which a source cell belongs. After the SN 2 receives the second indication information sent by the master base station, if the SN 2 receives, within the second preset threshold, the secondary base station reconfiguration complete message sent by the master base station, or if the SN 2 receives, at the last timing moment within the second preset threshold, the secondary base station reconfiguration complete message sent by the master base station (optionally, if the secondary base station reconfiguration complete message is related to handover completion of the UE), the terminal device is handed over from the source secondary base station to the target secondary base station too early.

Alternatively, the too early SN change may be defined as follows. If a target cell to which the terminal device is handed over belongs to an SN 2 other than an SN 1 to which a source cell belongs, after the SN 2 receives the second indication information sent by the master base station, if the SN 2 receives the secondary base station reconfiguration complete message sent by the master base station, and there is same UE in the SN 2 ready for the secondary base station change, the terminal device is handed over from the source secondary base station to the target secondary base station too early.

In this embodiment of this application, the target SN may alternatively determine whether the mobility problem of the UE is too early SN change or change to wrong SN, based on whether the duration between the moment at which the second indication information is received and the moment at which the secondary base station reconfiguration complete message is received falls within the second preset threshold and whether the SN reselected by the MN for the UE is a source SN or a new SN. For a specific determining manner, refer to related descriptions in the embodiment shown in FIG. 5, and details are not described herein again.

For sending manners of the second indication information, the third indication information, and the fourth indication information, refer to the embodiment shown in FIG. 6. Details are not described herein again.

In this embodiment of this application, the second preset threshold may be started by the target secondary base station. Optionally, the second preset threshold may be configured by the target secondary base station, an OAM device of the target secondary base station, or the master base station. For example, the master base station sends the second preset threshold to the target secondary base station.

In this embodiment of this application, if a radio link failure occurs after the terminal device successfully accesses the target secondary base station, the terminal device may send the second indication information to the target secondary base station through the master base station, to indicate the radio link failure between the terminal device and the target secondary base station. The target secondary base station determines, based on an interval between a moment at which the second indication information is received and the moment at which the secondary base station reconfiguration complete message is received, whether the radio link failure cause is that the secondary base station change is too early, so that the master base station optimizes a mobility parameter of the secondary base station based on the radio link failure cause. This avoids a mobility failure caused by too early secondary base station change.

Figure 7:
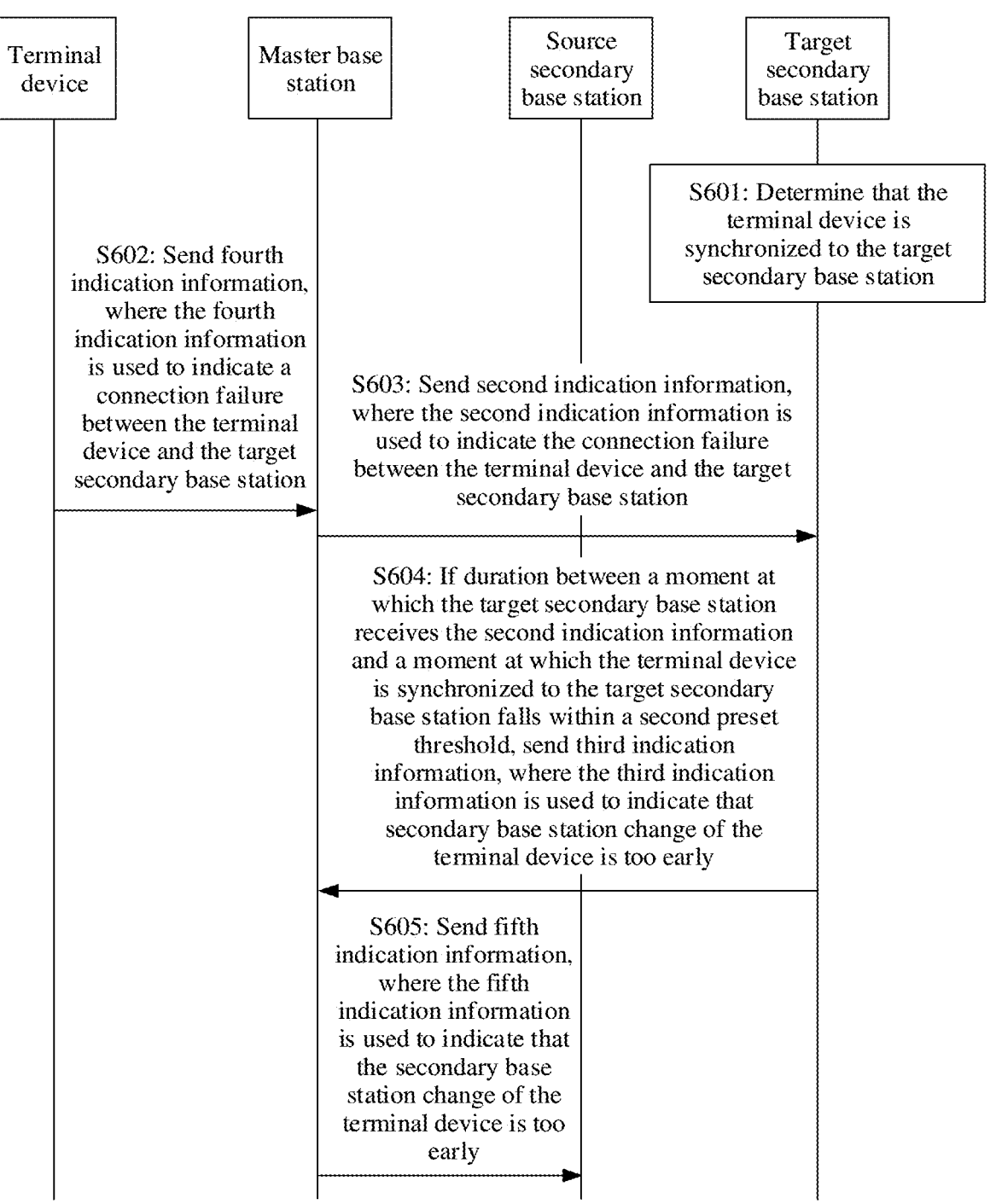
FIG. 7 is a schematic flowchart of another data transmission method according to an embodiment of this application.
Figure 8:
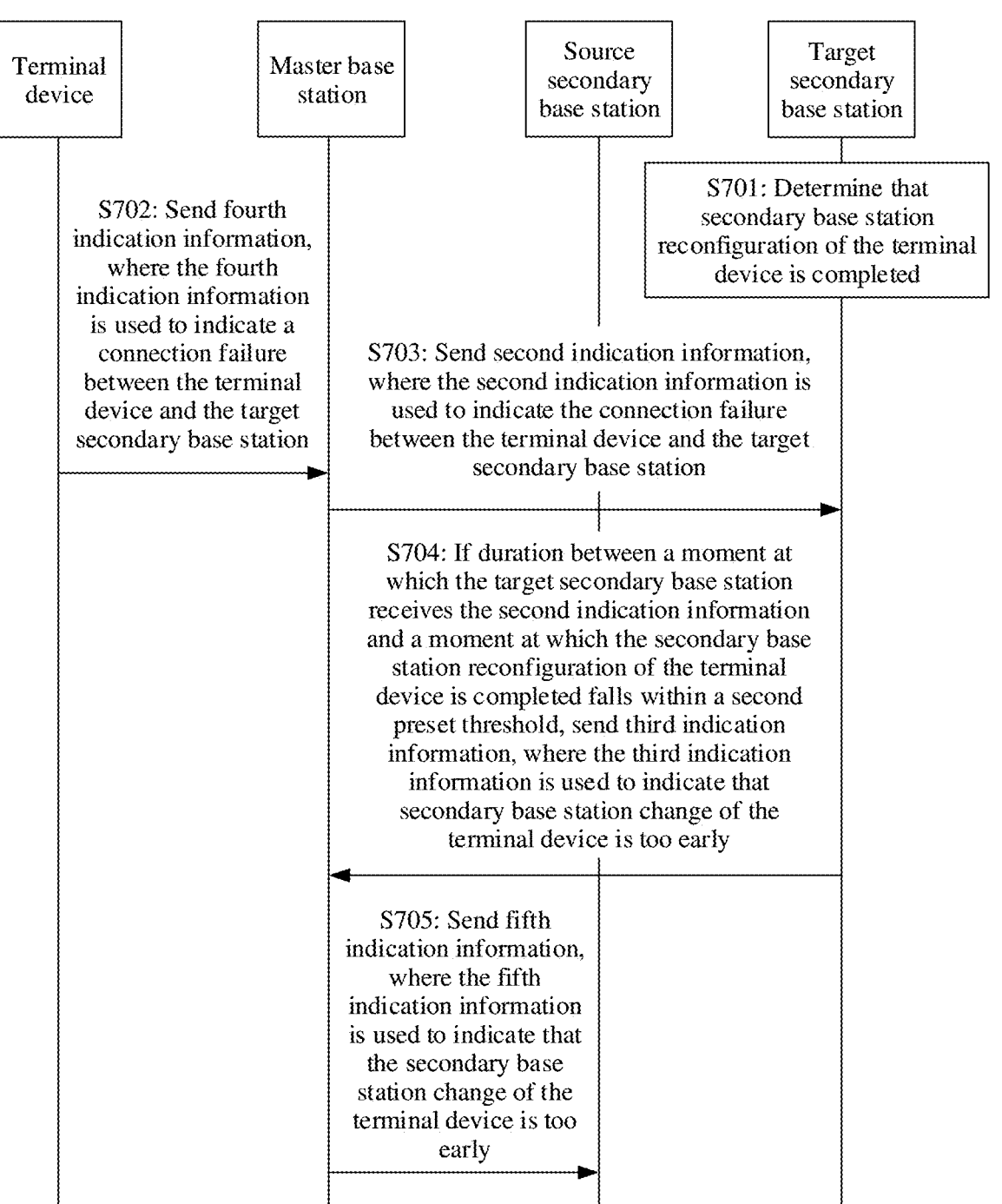
FIG. 8 is a schematic flowchart of another data transmission method according to an embodiment of this application.

In the embodiments shown in FIG. 6, FIG. 7, and FIG. 8, the target secondary base station detects a mobility problem. In another optional embodiment, the master base station may further detect a mobility problem of the terminal device. For details, refer to FIG. 9.

S801: A target secondary base station sends a third preset threshold to a master base station, and the master base station receives the third preset threshold, where the third preset threshold is used by the master base station to detect a mobility problem of a terminal device.

S802: The master base station detects the mobility problem of the terminal device based on the third preset threshold.

In this embodiment of this application, the third preset threshold is obtained by the master base station from the target secondary base station. If the third preset threshold is obtained by the master base station from the target secondary base station, the target secondary base station may further send, in addition to sending the third preset threshold to the master base station, an identifier of the target secondary base station to which the third preset threshold is applicable and/or an identifier of a cell to which the third preset threshold is applicable, so that the master base station identifies a specific secondary base station and/or one or more specific secondary cells on the secondary base station that the third preset threshold is specific for. The third preset threshold may be configured by the target secondary base station or an OAM of the target secondary base station.

The master base station may detect the mobility problem based on the third preset threshold. For example, for a process in which the master base station detects the mobility problem, refer to FIG. 10. Before step S802, the method further includes the following steps.

S803: The master base station sends a release request to a source secondary base station, and the source secondary base station receives the release request from the master base station, where the release request is used to request the source secondary base station to release a context of the terminal device.

S804: The terminal device sends fourth indication information to the master base station, and the master base station receives the fourth indication information from the terminal device, where the fourth indication information is used to indicate a radio link failure between the terminal device and the target secondary base station.

Step S802 is specifically: If duration between a moment at which the master base station receives the fourth indication information and a moment at which the master base station sends the release request falls within the third preset threshold, the master base station determines that secondary base station change of the terminal device is too early.

A sequence of performing steps S801 and S803 is not limited.

Optionally, if the master base station triggers a secondary base station change process, the master base station adjusts a mobility parameter based on the third indication information. If the secondary base station triggers the secondary base station change process, the master base station may further send fifth indication information to the source secondary base station after determining that the secondary base station change of the terminal device is too early, where the fifth indication information is used to indicate that secondary network device change of the terminal device is too early. The secondary base station adjusts the mobility parameter based on the fifth indication information.

In this embodiment of this application, the terminal device may report a radio link failure event of the target secondary base station to the master base station via the fourth indication information. The master base station determines, by identifying whether the duration between the moment at which the fourth indication information is received and the moment at which the master base station sends the release request falls within the third preset threshold, whether the secondary base station change of the terminal device is too early. If the duration between the moment at which the master base station receives the fourth indication information and the moment at which the master base station sends the release request falls within the third preset threshold, the master base station determines that the secondary base station change of the terminal device is too early.

In an implementation, after sending the release request, the master base station starts a timer, where timing duration of the timer is the third preset threshold. If the timer is still running when the master base station receives the fourth indication information sent by the terminal device, the master base station determines that a cause for the radio link failure between the terminal device and the target secondary base station is too early secondary base station change. In this embodiment of this application, the third preset threshold may be a relatively short period of time. A specific length of the period of time is not limited in this embodiment. For example, a value of the period of time corresponding to the "third preset threshold" may be less than 10 ms. The third preset threshold may be the same as or different from the first preset threshold and the second preset threshold in the foregoing embodiments.

In this embodiment of this application, an example in which the master base station receives the third preset threshold sent by the target secondary base station is used for description. Too early SN change may be defined as follows. A target cell to which the terminal device is handed over belongs to an SN 2 other than an SN 1 to which a source cell belongs. After an MN receives the fourth indication information sent by the UE, if the master base station sends a UE context release request to the source secondary base station, if the timer is still running, the terminal device is handed over from the source secondary base station to the target secondary base station too early.

Alternatively, the too early SN change may be defined as follows. A target cell to which the terminal device is handed over belongs to an SN 2 other than an SN 1 to which a source cell belongs. After the SN 2 receives the fourth indication information sent by the UE, if the master base station sends the release request to the source secondary base station, the release request is sent within the third preset threshold or is sent at the last timing moment of the third preset threshold, and the release request is related to handover completion of the UE, the terminal device is handed over from the source secondary base station to the target secondary base station too early.

Alternatively, the too early SN change may be defined as follows. If a target cell to which the terminal device is handed over belongs to an SN 2 other than an SN 1 to which a source cell belongs, after the SN 2 receives the fourth indication information sent by the master base station, if the master base station sends the release request, and there is same UE in the SN 2 ready for the secondary base station change, the terminal device is handed over from the source secondary base station to the target secondary base station too early.

Alternatively, the too early SN change may be defined as follows. If SN change is performed on the terminal device recently, that is, if timing duration of the timer reported by the terminal device is less than the third preset threshold, and a secondary base station to which the UE is reconnected and that is determined by an MN is a secondary base station that serves the UE during initialization of the last SN change, the terminal device is handed over from the source secondary base station to the target secondary base station too early. The timer reported by the terminal device is used to indicate interval time from initialization of last SN change to a moment at which the terminal device reports radio link failure indication information (that is, the fourth indication information) to the MN. The timer may be included in the fourth indication information and reported to the MN.

In this embodiment of this application, the mobility problem may further include too late SN change or change to wrong cell (or wrong SN), in addition to the too early SN change.

The SN change to wrong cell may be defined as follows. If SN change is performed on the terminal device recently, that is, if timing duration of the timer reported by the terminal device is less than the third preset threshold, and a secondary base station to which the UE is reconnected and that is determined by the MN is neither a secondary base station that serves the UE during initialization of the last SN change nor a secondary base station on which a secondary base station radio link failure occurs, incorrect SN change occurs.

In this embodiment of this application, an example in which the master base station receives the third preset threshold sent by the target secondary base station is used for description. The too late SN change may be defined as follows. If the terminal device does not receive an SN change command before a radio link failure occurs on the terminal device (a radio link failure with the target secondary base station), that is, if timing duration of the timer reported by the terminal device is greater than the third preset threshold, the terminal device is handed over from the source secondary base station to the target secondary base station too late. The timer reported by the terminal device is used to indicate interval time from initialization of last SN change to a moment at which the terminal device reports radio link failure indication information (that is, the fourth indication information) to the MN. The timer may be included in the fourth indication information and reported to the MN.

Optionally, the third preset threshold may further be configured by the master base station or an OAM of the master base station.

This embodiment of this application may be applicable to the secondary base station change process of the UE triggered by the SN shown in FIG. 3A, or may be applicable to the secondary base station change process of the UE triggered by the MN shown in FIG. 3B.

In this embodiment of this application, if a radio link failure occurs after the terminal device successfully accesses the target secondary base station, the terminal device may send the fourth indication information to the master base station, to indicate the radio link failure between the terminal device and the target secondary base station. The master base station determines, based on an interval between a moment at which the fourth indication information is received and a moment at which a UE context release message is sent to the source secondary base station, whether the radio link failure cause is that the secondary base station change is too early, so that the master base station or the source secondary base station optimizes a mobility parameter of the secondary base station based on the radio link failure cause. This avoids a mobility failure caused by too early secondary base station change.

Optionally, the foregoing provides descriptions that the master base station detects too late secondary base station change and change to wrong cell based on the timer reported by the terminal device and the third preset threshold. In this embodiment of this application, the master base station may further send the timer to the target secondary base station after receiving the timer sent by the terminal device. The target secondary base station may detect the too late secondary base station change and the change to wrong cell based on the timer and the fourth preset threshold. For details, refer to the following procedure.

S901: A master base station sends a first timer to a target secondary base station, and the target secondary base station receives the first timer from the master base station, where the first timer is used to indicate time from initialization of last secondary base station change of a terminal device to a moment at which the terminal device reports fourth indication information.

The first timer is sent by the terminal device to the master base station. For example, the first timer is included in the fourth indication information sent by the UE to the master base station, and the fourth indication information is used to indicate a radio link failure between the terminal device and the target secondary base station. Optionally, the master base station may further send second indication information to the target base station, where the second indication information is used to indicate the radio link failure between the terminal device and the target secondary base station. The second indication information may include content in the fourth indication information. Optionally, the second indication information may further include one or more of an identifier of a cell on which the radio link failure occurs, an identifier of the master base station, an identifier of a source secondary base station, and the like. This is not limited in this application.

S902: The target secondary base station detects a mobility problem of the terminal device based on the first timer.

Specifically, based on a configured fourth preset threshold and the first timer, the target secondary base station determines that SN change is too late if timing duration of the first timer is greater than the fourth preset threshold, or SN change is too early or SN change is incorrect if timing duration of the first timer is less than the fourth preset threshold.

It should be noted that the fourth preset threshold may be configured by the master base station, an OAM of the master base station, or an OAM of the secondary base station. This is not limited in this embodiment of this application.

The following steps may be further performed before the foregoing two steps.

S903: The terminal device sends the fourth indication information to the master base station, and the master base station receives the fourth indication information from the terminal device, where the fourth indication information is used to indicate the radio link failure between the terminal device and the target secondary base station.

The radio link failure between the terminal device and the target secondary base station may be an SCG failure.

Information about the SCG failure includes a timer, and the timer is used to indicate time since initialization of last SN change of the UE.

In this embodiment of this application, an example in which the secondary base station receives the first timer sent by the master base station is used for description.

In this embodiment of this application, the too early SN change may be defined as follows. If SN change is performed on the terminal device recently, that is, if timing duration of the first timer is less than the fourth preset threshold, and a secondary base station to which the UE is reconnected and that is determined by an MN is a secondary base station that serves the UE during initialization of the last SN change, the UE is handed over from the source secondary base station to the target secondary base station too early. If timing duration of the first timer is less than the fourth preset threshold, and a secondary base station to which the UE is reconnected and that is determined by an MN is neither a secondary base station that serves the UE during initialization of the last SN change nor a secondary base station on which a secondary base station radio link failure occurs, incorrect SN change occurs.

In this embodiment of this application, too late SN change may be defined as: If timing duration of the first timer is greater than the fourth preset threshold, the terminal device is handed over from the source secondary base station to the target secondary base station too late.

The foregoing mainly describes the solutions provided in the embodiments of this application from a perspective of interaction between network elements. It may be understood that, to implement the foregoing functions, each network element, for example, the first network device, the second network device, and the third network device, includes a corresponding hardware structure and/or software module for performing each function. A person skilled in the art should easily be aware that, in combination with the examples described in the embodiments disclosed in this specification, network elements and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

It may be understood that, in the foregoing methods, the method implemented by the first network device may alternatively be implemented by a component (for example, a chip or a circuit) that may be configured in the first network device, the method implemented by the second network device may alternatively be implemented by a component (for example, a chip or a circuit) that may be configured in the second network device, the method implemented by the third network device may alternatively be implemented by a component (for example, a chip or a circuit) that may be configured in the third network device, and the method implemented by the terminal device may alternatively be implemented by a component (for example, a chip or a circuit) that may be configured in the terminal device.

In the embodiments of this application, division into functional modules may be performed on the first network device, the second network device, and the like based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division in an actual implementation.

Figure 11:
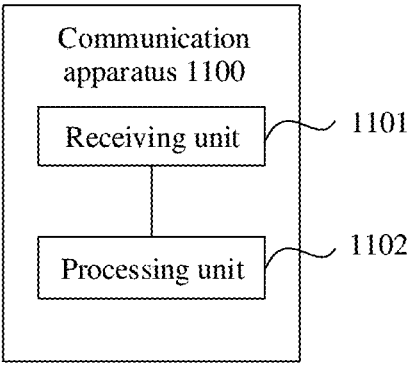
FIG. 11 is a schematic diagram of a structure of a communication apparatus according to an embodiment of this application.

When each functional module is obtained through division based on each corresponding function, FIG. 11 is a schematic diagram of a structure of a communication apparatus. The communication apparatus may correspondingly implement functions or operations of the first network device in the foregoing embodiment. The communication apparatus may be the first network device or a component configured in the first network device.

For example, the communication apparatus 1100 may include a receiving unit 1101 and a processing unit 1102. For example, the receiving unit 1101 is configured to support the communication apparatus 1100 to perform the step corresponding to receiving information by the first network device in the method embodiment shown in FIG. 5 or FIG. 6. The processing unit 1102 is configured to support the communication apparatus 1100 to perform processing steps corresponding to the first network device in the foregoing method embodiment shown in FIG. 5 or FIG. 6, for example, implement functions other than functions of a sending unit and the receiving unit. Optionally, the communication apparatus 1100 may further include the sending unit, configured to support the communication apparatus 1100 to perform the step corresponding to sending information by the first network device in the method embodiment shown in FIG. 5 or FIG. 6. Optionally, the communication apparatus 1100 may further include a storage unit, configured to store code (a program) or data. The processing unit 1102 may read the code or data from the storage unit, to implement a corresponding operation. For example, the receiving unit 1101 is configured to receive first indication information from a second network device, where the first indication information is used to indicate that a terminal device is successfully handed over from a third network device to the first network device or that the third network device has released a context of the terminal device. The processing unit 1102 is configured to detect a mobility problem based on the first indication information.

In an implementation, the receiving unit 1101 may be a receiver, a receiving circuit, an interface circuit, or the like. The processing unit 1102 may be a processor, a processing circuit, or the like. The sending unit may be a transmitter, a transmitting circuit, an interface circuit, or the like. The storage unit may be a memory. The processing unit, the sending unit, the receiving unit, and the storage unit may be integrated together or separated from each other.

Figure 12:
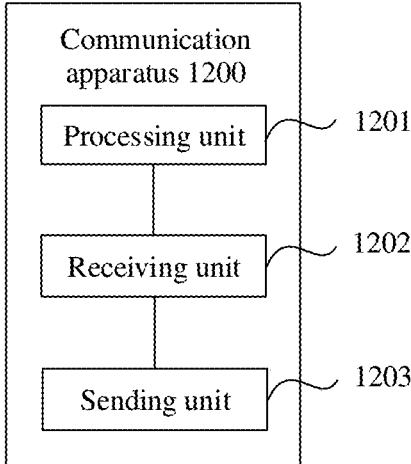
FIG. 12 is a schematic diagram of a structure of another communication apparatus according to an embodiment of this application.

FIG. 12 is a schematic diagram of a structure of another communication apparatus. The communication apparatus may correspondingly implement functions or operations of the first network device in the foregoing embodiment. The communication apparatus may be the first network device or a component configured in the first network device.

For example, the communication apparatus 1200 may include a processing unit 1201, a receiving unit 1202, and a sending unit 1203. For example, the processing unit 1201 is configured to support the communication apparatus 1200 to perform processing steps corresponding to the first network device in the foregoing method embodiment shown in FIG. 7 or FIG. 8, for example, implement functions other than functions of the sending unit and the receiving unit. The receiving unit 1202 is configured to support the communication apparatus 1210 to perform the step corresponding to receiving information by the first network device in the method embodiment shown in FIG. 7 or FIG. 8. The sending unit 1203 is configured to support the communication apparatus 1200 to perform the step corresponding to sending information by the first network device in the method embodiment shown in FIG. 7 or FIG. 8. Optionally, the communication apparatus 1200 may further include a storage unit, configured to store code (a program) or data. The processing unit 1201 may read the code or data from the storage unit, to implement a corresponding operation. For example, the processing unit 1201 is configured to determine that a terminal device is synchronized to the first network device. The receiving unit 1202 is configured to receive second indication information from a second network device, where the second indication information is used to indicate a radio link failure between the terminal device and the first network device. The sending unit 1203 is configured to: if duration between a moment at which the communication apparatus 1200 receives the second indication information and a moment at which the terminal device is synchronized to the first network device falls within a second preset threshold, send third indication information to the second network device, where the third indication information is used to indicate that secondary network device change of the terminal device is too early. Alternatively, in another implementation, the processing unit 1201 is configured to determine that secondary network device reconfiguration of a terminal device is completed. The receiving unit 1202 is configured to receive second indication information from a second network device, where the second indication information is used to indicate a radio link failure between the terminal device and the first network device. The sending unit 1203 is configured to: if duration between the moment at which the communication apparatus 1200 receives the second indication information and the moment at which the secondary network device reconfiguration of the terminal device is completed falls within a second preset threshold, send third indication information to the second network device, where the third indication information is used to indicate that secondary network device change of the terminal device is too early.

In an implementation, the processing unit 1201 may be a processor, a processing circuit, or the like. The receiving unit 1202 may be a receiver, a receiving circuit, an interface circuit, or the like. The sending unit 1203 may be a transmitter, a transmitting circuit, an interface circuit, or the like. The storage unit may be a memory. The processing unit, the sending unit, the receiving unit, and the storage unit may be integrated together or separated from each other.

Figure 13:
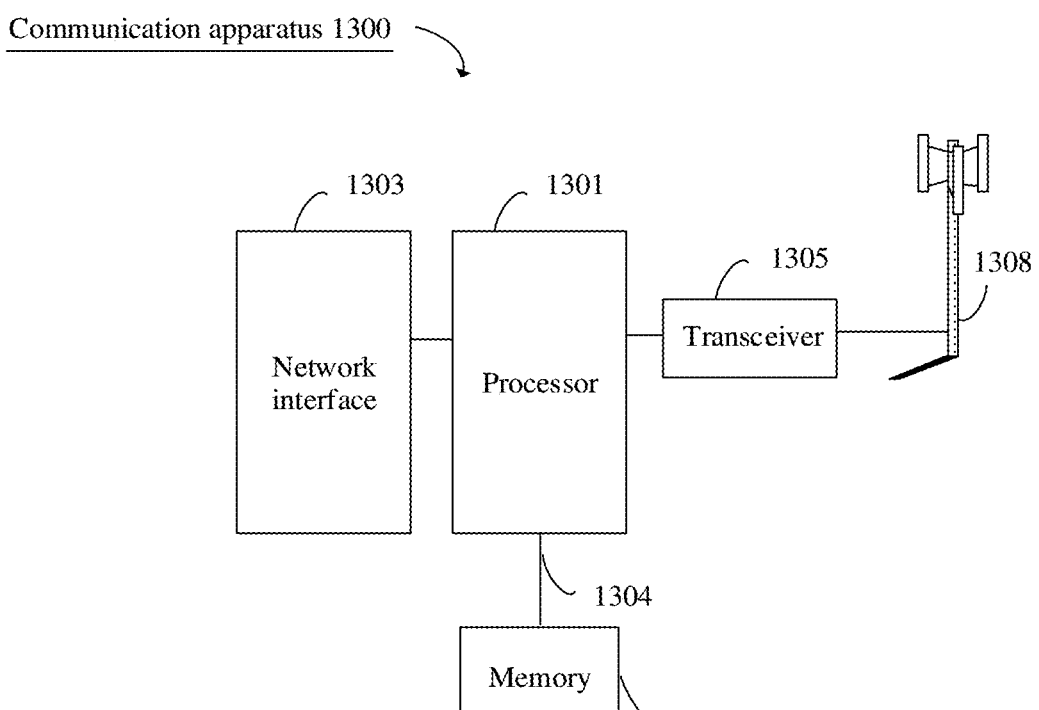
FIG. 13 is a schematic diagram of a structure of another communication apparatus according to an embodiment of this application.

FIG. 13 is a schematic diagram of a structure of another communication apparatus. As shown in FIG. 13, the communication apparatus 1300 may include one or more processors 1301, a memory 1302, a network interface 1303, a transceiver 1305, and an antenna 1308. These components may be connected to each other through a bus 1304 or in another manner. In FIG. 13, an example in which the components are connected to each other through the bus is used.

The network interface 1303 may be used by the communication apparatus 1300 for communicating with another communication device, for example, another network device. Specifically, the network interface 1303 may be a wired interface.

The transceiver 1305 may be configured to perform transmission processing on a signal output by the processor 1301, for example, signal modulation. The transceiver 1305 may further be configured to perform reception processing on a mobile communication signal received by the antenna 1308, for example, signal demodulation. In some embodiments of this application, the transceiver 1305 may be considered as a wireless modem. In the communication apparatus 1300, there may be one or more transceivers 1305. The antenna 1308 may be configured to convert electromagnetic energy in a transmission line into an electromagnetic wave in free space, or convert an electromagnetic wave in free space into electromagnetic energy in a transmission line.

The memory 1302 may be coupled to the processor 1301 through the bus 1304 or an input/output port. Alternatively, the memory 1302 may be integrated with the processor 1301. The memory 1302 is configured to store various software programs and/or a plurality of groups of instructions or data. Specifically, the memory 1302 may include a high-speed random access memory, and may further include a non-volatile memory, for example, one or more magnetic disk storage devices, a flash storage device, or another non-volatile solid-state storage device. The memory 1302 may store an operating system (which is briefly referred to as a system below), for example, an embedded operating system such as uCOS, VxWorks, or RTLinux. The memory 1302 may further store a network communication program. The network communication program may be used to communicate with one or more additional devices, one or more user equipment devices, and one or more network devices.

The processor 1301 may be a central processing unit, a general-purpose processor, a digital signal processor, an application-specific integrated circuit, a field programmable gate array or another programmable logic device, a transistor logic device, a hardware component, or any combination thereof. The processor 1301 may implement or execute various example logical blocks, modules, and circuits described with reference to content disclosed in this application. Alternatively, the processor may be a combination of processors implementing a determining function, for example, a combination of one or more microprocessors or a combination of a digital signal processor and a microprocessor.

In this embodiment of this application, the processor 1301 may be configured to read and execute computer-readable instructions. Specifically, the processor 1301 may be configured to invoke a program stored in the memory 1302, for example, a program for implementing the data transmission method on a first network device side provided in one or more embodiments of this application, and execute instructions included in the program.

It may be understood that the communication apparatus 1300 may be the network device 101 in the wireless communication system 100 shown in FIG. 1, a target secondary base station connected to a terminal device after secondary base station change, or the like.

It should be noted that the communication apparatus 1300 shown in FIG. 13 is merely an implementation of this embodiment of this application. In actual application, the communication apparatus 1300 may further include more or fewer components. This is not limited herein. For a specific implementation of the communication apparatus 1300, refer to related descriptions about the first network device in the foregoing method embodiment. Details are not described herein again.

Figure 14:
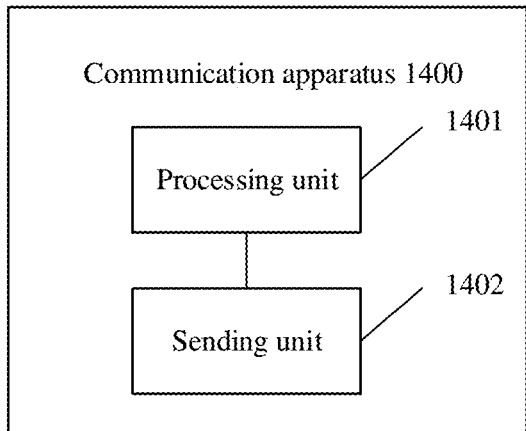
FIG. 14 is a schematic diagram of a structure of another communication apparatus according to an embodiment of this application.

When each functional module is obtained through division based on each corresponding function, FIG. 14 is a schematic diagram of a structure of another communication apparatus. The communication apparatus may be the second network device in the foregoing method embodiment, or a component (for example, a chip system or a hardware circuit) configured in the second network device.

For example, the communication apparatus 1400 may include a processing unit 1401 and a sending unit 1402. For example, the processing unit 1401 is configured to support the second network device to perform processing steps corresponding to the second network device in the foregoing method embodiment shown in FIG. 5 or FIG. 6, for example, implement functions other than functions of the sending unit and a receiving unit. The sending unit 1402 is configured to support the communication apparatus 1400 to perform the step corresponding to sending information by the second network device in the method embodiment shown in FIG. 5 or FIG. 6. Optionally, the second network device may further include a receiving unit, configured to support the communication apparatus 1400 to perform the step corresponding to receiving information by the second network device in the method embodiment shown in FIG. 5 or FIG. 6. Optionally, the communication apparatus 1400 may further include a storage unit, configured to store code (a program) or data. The processing unit 1102 may read the code or data from the storage unit, to implement a corresponding operation. For example, the processing unit 1401 is configured to generate first indication information, where the first indication information is used to indicate that a terminal device is successfully handed over from a third network device to the first network device or that the third network device has released a context of the terminal device. The sending unit 1402 is configured to send the first indication information to the first network device, where the first indication information is used by the first network device to detect a mobility problem.

In hardware implementation, the processing unit 1401 may be a processor, a processing circuit, or the like. The sending unit 1402 may be a transmitter, a transmitting circuit, an interface circuit, or the like. The storage unit may be a memory. The receiving unit may be a receiver, a receiving circuit, an interface circuit, or the like. The processing unit, the sending unit, the receiving unit, and the storage unit may be integrated together or separated from each other.

Figure 15:
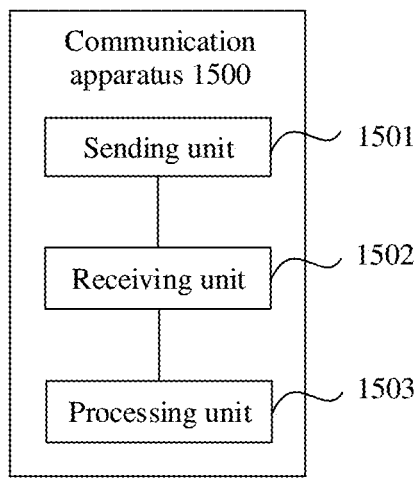
FIG. 15 is a schematic diagram of a structure of another communication apparatus according to an embodiment of this application.

FIG. 15 is a schematic diagram of a structure of another communication apparatus. The communication apparatus may correspondingly implement functions or operations of the first network device in the foregoing embodiment. The communication apparatus may be a second network device or a component configured in the second network device.

For example, the communication apparatus 1500 may include a sending unit 1501, a receiving unit 1502, and a processing unit 1503. For example, the sending unit 1501 is configured to support the communication apparatus 1500 to perform the step corresponding to sending information by the second network device in the method embodiment shown in FIG. 9. The receiving unit 1502 is configured to support the communication apparatus 1500 to perform the step corresponding to receiving information by the second network device in the method embodiment shown in FIG. 9. The processing unit 1503 is configured to support the second network device to perform processing steps corresponding to the second network device in the foregoing method embodiment shown in FIG. 9, for example, implement functions other than functions of the sending unit and the receiving unit. Optionally, the communication apparatus 1500 may further include a storage unit, configured to store code (a program) or data. The processing unit 1102 may read the code or data from the storage unit, to implement a corresponding operation. For example, the sending unit 1501 is configured to send a release request to a third network device, where the release request is used to request the third network device to release a context of a terminal device. The receiving unit 1502 is configured to receive fourth indication information from the terminal device, where the fourth indication information is used to indicate a radio link failure between the terminal device and a first network device. The first network device is a target secondary network device to which the terminal device is handed over from the third network device. The processing unit 1503 is configured to: if duration between a moment at which the communication apparatus 1500 receives the fourth indication information and a moment at which the second network device sends the release request falls within a third preset threshold, determine that secondary network device change of the terminal device is too early.

In hardware implementation, the sending unit 1501 may be a transmitter, a transmitting circuit, an interface circuit, or the like. The receiving unit 1502 may be a receiver, a receiving circuit, an interface circuit, or the like. The processing unit 1503 may be a processor, a processing circuit, or the like. The storage unit may be a memory. The processing unit, the sending unit, the receiving unit, and the storage unit may be integrated together or separated from each other.

Figure 16:
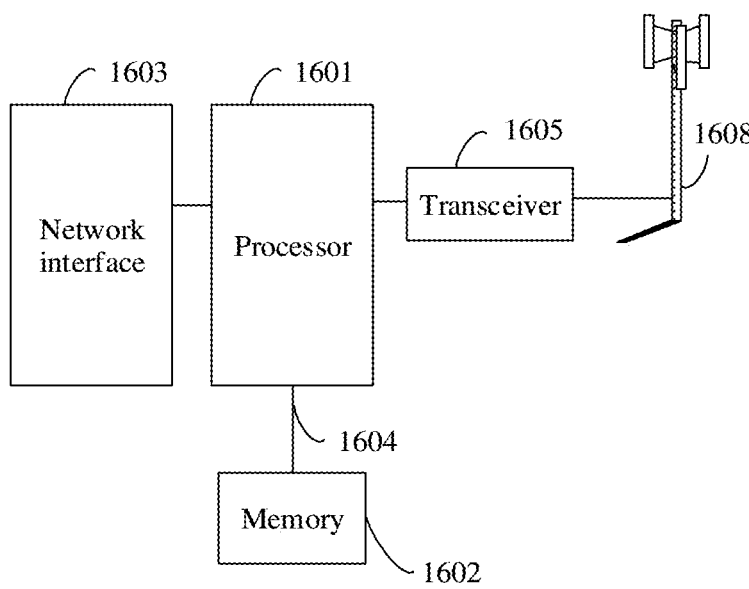
FIG. 16 is a schematic diagram of a structure of another communication apparatus according to an embodiment of this application.

FIG. 16 is a schematic diagram of a structure of another communication apparatus. As shown in FIG. 16, the communication apparatus 1600 may include one or more processors 1601, a memory 1602, a network interface 1603, a transceiver 1605, and an antenna 1608. These components may be connected to each other through a bus 1604 or in another manner. In FIG. 16, an example in which the components are connected to each other through the bus is used.

The network interface 1603 may be used by the communication apparatus 1600 for communicating with another communication device, for example, another network device. Specifically, the network interface 1603 may be a wired interface.

The transceiver 1605 may be configured to perform transmission processing on a signal output by the processor 1601, for example, signal modulation. The transceiver 1605 may further be configured to perform reception processing on a mobile communication signal received by the antenna 1608, for example, signal demodulation. In some embodiments of this application, the transceiver 1605 may be considered as a wireless modem. In the communication apparatus 1600, there may be one or more transceivers 1605. The antenna 1608 may be configured to convert electromagnetic energy in a transmission line into an electromagnetic wave in free space, or convert an electromagnetic wave in free space into electromagnetic energy in a transmission line.

The memory 1602 may be coupled to the processor 1601 through the bus 1604 or an input/output port. Alternatively, the memory 1602 may be integrated with the processor 1601. The memory 1602 is configured to store various software programs and/or a plurality of groups of instructions or data. Specifically, the memory 1602 may include a high-speed random access memory, and may further include a non-volatile memory, for example, one or more magnetic disk storage devices, a flash storage device, or another non-volatile solid-state storage device. The memory 1602 may store an operating system (which is briefly referred to as a system below), for example, an embedded operating system such as uCOS, VxWorks, or RTLinux. The memory 1602 may further store a network communication program. The network communication program may be used to communicate with one or more additional devices, one or more user equipment devices, and one or more network devices.

The processor 1601 may be a central processing unit, a general-purpose processor, a digital signal processor, an application-specific integrated circuit, a field programmable gate array or another programmable logic device, a transistor logic device, a hardware component, or any combination thereof. The processor 1601 may implement or execute various example logical blocks, modules, and circuits described with reference to content disclosed in this application. Alternatively, the processor may be a combination of processors implementing a determining function, for example, a combination of one or more microprocessors or a combination of a digital signal processor and a microprocessor.

In this embodiment of this application, the processor 1601 may be configured to read and execute computer-readable instructions. Specifically, the processor 1601 may be configured to invoke a program stored in the memory 1602, for example, a program for implementing the data transmission method on a second network device side provided in one or more embodiments of this application, and execute instructions included in the program.

It may be understood that the communication apparatus 1600 may be the network device 101 in the wireless communication system 100 shown in FIG. 1, a master base station connected to a terminal device, or the like.

It should be noted that the communication apparatus 1600 shown in FIG. 16 is merely an implementation of this embodiment of this application. In actual application, the communication apparatus 1600 may further include more or fewer components. This is not limited herein. For a specific implementation of the communication apparatus 1600, refer to related descriptions about the second network device in the foregoing method embodiment. Details are not described herein again.

Figure 17:
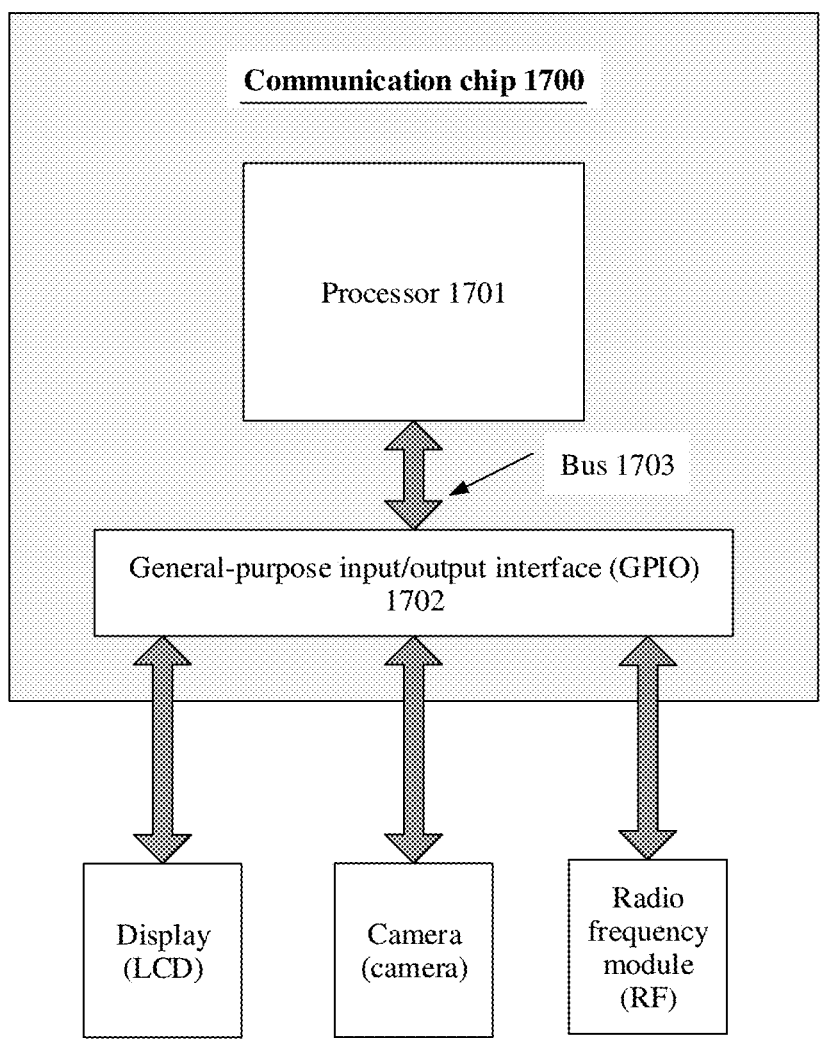
FIG. 17 is a schematic diagram of a structure of a communication chip according to an embodiment of this application.

FIG. 17 is a schematic diagram of a structure of a communication chip according to this application. As shown in FIG. 17, the communication chip 1700 may include a processor 1701, and one or more interfaces 1702 coupled to the processor 1701.

For example, the processor 1701 may be configured to read and execute computer-readable instructions. In specific implementation, the processor 1701 may mainly include a controller, an arithmetic unit, and a register. For example, the controller is mainly responsible for decoding instructions, and sends a control signal for operations corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. In specific implementation, a hardware architecture of the processor 1701 may be an application-specific integrated circuit (ASIC) architecture, a microprocessor without interlocked piped stages (MIPS) architecture, an advanced reduced instruction set computing machine (advanced RISC machine, ARM) architecture, a network processor (NP) architecture, or the like. The processor 1701 may be a single-core or multi-core processor.

For example, the interface 1702 may be configured to input to-be-processed data to the processor 1701, and may output a processing result of the processor 1701. In specific implementation, the interface 1702 may be a general-purpose input/output (GPIO) interface, and may be connected to at least one peripheral device (for example, a display (LCD), a camera, and a radio frequency (RF) module). The interface 1702 is connected to the processor 1701 through a bus 1703.

In a possible implementation, the processor 1701 may be configured to invoke, from a memory, a program or data for implementing the data transmission method on an access network device side provided in one or more embodiments of this application, so that the chip can implement related functions of the data transmission methods shown in FIG. 5 to FIG. 9 on the first network device. In another possible implementation, the processor 1701 may be configured to invoke, from a memory, a program or data for implementing the data transmission method on a second network device side provided in one or more embodiments of this application, so that the chip can implement related operations of the data transmission methods shown in FIG. 5 to FIG. 9 on customer premises equipment. The memory may be integrated with the processor 1701, or may be coupled to the communication chip 1700 through the interface 1702. In other words, the memory may be a part of the communication chip 1700, or may be independent of the communication chip 1700. The interface 1702 may be configured to output an execution result of the processor 1701. For the data transmission method provided in one or more embodiments of this application, refer to the foregoing embodiments. Details are not described herein again.

It should be noted that a function corresponding to each of the processor 1701 and the interface 1702 may be implemented by using a hardware design, a software design, or a combination of software and hardware. This is not limited herein.

In another embodiment of this application, a computer-readable storage medium is further provided. The computer-readable storage medium stores computer-executable instructions. When a device (which may be a single chip microcomputer, a chip, or the like) or a processor may invoke the computer-executable instructions stored in the readable storage medium, so that the device or the processor performs the steps of the first network device or the second network device in the data transmission method provided in FIG. 5 to FIG. 10. The computer-readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs steps of the first network device or the second network device in the data transmission method provided in FIG. 5 to FIG. 10.

In another embodiment of this application, a communication system is further provided. The communication system includes a plurality of devices, and the plurality of devices include a first network device or a second network device. For example, the first network device may be the first network device shown in FIG. 10, FIG. 11, or FIG. 12, and is configured to perform steps corresponding to the first network device in the data transmission method provided in FIG. 5 to FIG. 10; and/or the second network device may be the second network device shown in FIG. 13, FIG. 14, or FIG. 15, and is configured to perform steps corresponding to the second network device in the data transmission method provided in FIG. 5 to FIG. 10. Optionally, the plurality of devices may further include the third network device and the terminal device. For related functions of the third network device, refer to descriptions of the third network device in FIG. 5 to FIG. 10. For related functions of the terminal device, refer to descriptions of the terminal device in FIG. 5 to FIG. 10. Details are not described herein again.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In conclusion, the foregoing descriptions are merely example embodiments of this application, but are not intended to limit the protection scope of this application. Any modification, equivalent replacement, or improvement made without departing from the spirit and principle of this application shall fall within the protection scope of this application.

What is claimed is:

1. A method, comprising:

receiving, by a first network device, first indication information from a terminal device, wherein the first indication information indicates information of a first duration, wherein the first duration corresponds to a duration from a moment of initialization of a last secondary base station change of the terminal device to a moment of a radio link failure between the terminal device and a second network device, the first network device is a master base station connected to the terminal device, the second network device is a target secondary base station of the last secondary base station change, and a third network device is a source secondary base station connected to the terminal device before the last secondary base station change;

detecting, by the first network device, a mobility problem based on the first indication information, wherein the mobility problem comprises that the last secondary base station change of the terminal device is too early or to a wrong cell, and wherein detecting the mobility problem based on the first indication information comprises:

when the first duration is less than a first preset threshold, determining, by the first network device, that the mobility problem is that the last secondary base station change of the terminal device is too early, or when the first duration is less than the first preset threshold, and a secondary base station to which the terminal device is reconnected is different from the third network device, determining, by the first network device, that the last secondary base station change of the terminal device is to the wrong cell, and wherein the first preset threshold is configured by the second network device or the first network device; and in response to detecting the mobility problem, when the last secondary base station change was triggered by the first network device, adjusting, by the first network device, a mobility parameter; and in response to detecting the mobility problem, when the last secondary base station change was triggered by the third network device, indicating, by the first network device, the third network device to adjust the mobility parameter.

2. The method according to claim 1, wherein detecting, by the first network device, the mobility problem based on the first indication information further comprises:

when the first duration is greater than the first preset threshold, determining, by the first network device, that the last secondary base station change of the terminal device is too late.

3. The method according to claim 1, further comprising:

sending a release request to the third network device, wherein the release request is used to request the third network device to release a context of the terminal device.

4. The method according to claim 1, wherein the first indication information further indicates the radio link failure between the terminal device and the second network device.

5. The method according to claim 1, wherein the first preset threshold is configured by the second network device.

6. The method according to claim 1, wherein the first preset threshold is configured by the first network device.

7. The method according to claim 1, further comprising:

sending, by the first network device, second indication information to the second network device, wherein the second indication information indicates that the terminal device is successfully handed over from the third network device to the second network device, or the third network device has released a context of the terminal device;

sending, by the first network device, third indication information to the second network device, wherein the third indication information indicates a radio link failure between the terminal device and the second network device; and receiving, by the first network device, fourth indication information from the second network device, wherein the fourth indication information indicates that the last secondary base station change of the terminal device is too early, and the last secondary base station change of the terminal device being too early is determined by the second network device based on a duration between a moment at which the second network device receives the fourth indication information and a moment at which the second network device receives the third indication information falls within a second preset threshold.

8. A communication system, comprising:

a first network device; and a second network device in communication with the first network device; and a third network device;

wherein the first network device is configured to:

receive first indication information from a terminal device, wherein the first indication information indicates information of a first duration, wherein the first duration corresponds to a duration from a moment of initialization of a last secondary base station change of the terminal device to a moment of a radio link failure between the terminal device and the second network device, the first network device is a master base station connected to the terminal device, the second network device is a target secondary base station of the last secondary base station change, and the third network device is a source secondary base station connected to the terminal device before the last secondary base station change;

detect a mobility problem based on the first indication information, wherein the mobility problem comprises that the last secondary base station change of the terminal device is too early or is to a wrong cell, and wherein detecting the mobility problem based on the first indication information comprises:

when the first duration is less than a first preset threshold, determining that the mobility problem is that the last secondary base station change of the terminal device is too early, or when the first duration is less than the first preset threshold, and a secondary base station to which the terminal device is reconnected is different from the third network device, determining that the last secondary base station change of the terminal device is to the wrong cell, and wherein the first preset threshold is configured by the second network device or the first network device;

in response to detecting the mobility problem, when the last secondary base station change was triggered by the first network device, adjust a mobility parameter; and in response to detecting the mobility problem, when the last secondary base station change was triggered by the third network device, indicate to the third network device to adjust the mobility parameter.

9. The communication system according to claim 8, wherein the first network device is further configured to:

when the first duration is greater than the first preset threshold, determine that the last secondary base station change of the terminal device is too late.

10. The communication system according to claim 8, wherein the communication system further comprises the terminal device.

11. The communication system according to claim 8, wherein the third network device is configured to receive a release request, wherein the release request requests the third network device to release a context of the terminal device.

12. The communication system according to claim 8, wherein the first indication information further indicates the radio link failure between the terminal device and the second network device.

13. The communication system according to claim 8, wherein the first preset threshold is configured by the second network device.

14. The communication system according to claim 8, wherein the first network device is further configured to:

send second indication information to the second network device, wherein the second indication information indicates that the terminal device is successfully handed over from the third network device to the second network device, or the third network device has released a context of the terminal device;

send third indication information to the second network device, wherein the third indication information indicates a radio link failure between the terminal device and the second network device; and receive fourth indication information from the second network device, wherein the fourth indication information indicates that the last secondary base station change of the terminal device is too early, and the last secondary base station change of the terminal device being too early is determined by the second network device based on a duration between a moment at which the second network device receives the fourth indication information and a moment at which the second network device receives the third indication information falls within a second preset threshold.

15. A non-transitory computer readable storage medium storing executable instructions that are executable by at least one processor, wherein executing the instructions causes a first network device to be enabled to:

receive first indication information from a terminal device, wherein the first indication information indicates information of a first duration, wherein the first duration corresponds to a duration from a moment of initialization of a last secondary base station change of the terminal device to a moment of a radio link failure between the terminal device and a second network device, the first network device is a master base station connected to the terminal device, the second network device is a target secondary base station of the last secondary base station change, and a third network device is a source secondary base station connected to the terminal device before the last secondary base station change;

detect a mobility problem based on the first indication information, wherein the mobility problem comprises that the last secondary base station change of the terminal device is too early or to a wrong cell, and wherein detecting the mobility problem based on the first indication information comprises:

when the first duration is less than a first preset threshold, determining that the mobility problem is that the last secondary base station change of the terminal device is too early, or when the first duration is less than the first preset threshold, and a secondary base station to which the terminal device is reconnected is different from the third network device, determining that the last secondary base station change of the terminal device is to the wrong cell;

in response to detecting the mobility problem, when the last secondary base station change was triggered by the first network device, adjust a mobility parameter; and in response to detecting the mobility problem, when the last secondary base station change was triggered by the third network device, indicate to the third network device to adjust the mobility parameter.

16. The non-transitory computer readable storage medium according to claim 15, wherein detecting the mobility problem based on the first indication information further comprises:

when the first duration is greater than the first preset threshold, determining, by the first network device, that the last secondary base station change of the terminal device is too late.

17. The non-transitory computer readable storage medium according to claim 15, wherein executing the instructions causes the first network device to be further enabled to:

send a release request to the third network device, wherein the release request is used to request the third network device to release a context of the terminal device.

18. The non-transitory computer readable storage medium according to claim 15, wherein the first indication information further indicates the radio link failure between the terminal device and the second network device.

19. The non-transitory computer readable storage medium according to claim 15, wherein executing the instructions causes the first network device to be further enabled to:

send second indication information to the second network device, wherein the second indication information indicates that the terminal device is successfully handed over from the third network device to the second network device, or the third network device has released a context of the terminal device;

send third indication information to the second network device, wherein the third indication information indicates a radio link failure between the terminal device and the second network device; and receive fourth indication information from the second network device, wherein the fourth indication information indicates that the last secondary base station change of the terminal device is too early, and the last secondary base station change of the terminal device being too early is determined by the second network device based on a duration between a moment at which the second network device receives the fourth indication information and a moment at which the second network device receives the third indication information falls within a second preset threshold.

* * * * *